US006937558B2

(12) United States Patent
Wakutsu

(10) Patent No.: US 6,937,558 B2
(45) Date of Patent: Aug. 30, 2005

(54) TRANSMITTER APPARATUS AND RECEIVER APPARATUS AND BASE STATION MAKING USE OF ORTHOGONAL FREQUENCY DIVISION MULTIPLEXING AND SPECTRUM SPREADING

(75) Inventor: Takashi Wakutsu, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 876 days.

(21) Appl. No.: 09/791,795

(22) Filed: Feb. 26, 2001

(65) Prior Publication Data

US 2001/0021182 A1 Sep. 13, 2001

(30) Foreign Application Priority Data

Feb. 29, 2000  (JP) ....................................... P2000-054028

(51) Int. Cl.[7] .......................... H04J 11/00; H04M 1/69; H04M 1/707
(52) U.S. Cl. ....................... 370/208; 370/436; 370/482; 375/146; 375/147; 375/316
(58) Field of Search ................................. 370/203, 204, 370/208, 330, 337, 338, 344, 436, 482; 375/146, 147, 150, 130, 261, 267, 298, 299, 316; 455/454, 69, 562

(56) References Cited

U.S. PATENT DOCUMENTS

| 5,983,101 A |   | 11/1999 | Billström |         |
|-------------|---|---------|-----------|---------|
| 6,016,313 A | * | 1/2000  | Foster et al. | 370/330 |
| 6,621,808 B1| * | 9/2003  | Sadri     | 370/335 |

FOREIGN PATENT DOCUMENTS

| EP | 0 899 906 | 3/1999 |
|----|-----------|--------|
| JP | 7-245574  | 9/1995 |
| JP | 9-247124  | 9/1997 |
| JP | 10-210002 | 8/1998 |
| JP | 2001-237803 | 8/2001 |
| JP | 2001-055275 | 9/2001 |
| WO | WO 99/04524 | 1/1999 |
| WO | WO 99/50989 | * 10/1999 |

OTHER PUBLICATIONS

Masataka Ilzuka, et al. "A Study on Cell Design for High–Speed Wireless LAN Using Multirate Transmission", IEICE 1999 Society Conference, Sep. 1999, p. 324.
Johan Torsner, et al. "Radio Network Solutions for HIPER-LAN/2", IEEE VTC Conference, May 1999, pp. 1217–1221.
Satoshi Muneta, et al. "A New Frequency–Domain Link Adaptation Scheme for Broadband OFDM Systems", IEEE VTC, Sep. 1999, pp. 253–257.
K. Hamaguchi, et al., Electronics Letters, IEE Stevenage, vol. 33, no. 18, XP–006007912, pp. 1529–1531, "Implementation and Performance of QAM–Level–Controlled Adaptive Modulation for Land Mobile Communications", Aug. 28, 1997.

* cited by examiner

*Primary Examiner*—Afsar Qureshi
(74) *Attorney, Agent, or Firm*—Oblon, Spivak, McClelland, Maier & Neustadt, P.C.

(57) ABSTRACT

An improved transmitter apparatus, a receiver apparatus and a base station implemented with the transmitter and receiver apparatuses are described. These apparatuses and the base station serves to establish communication by making use of an orthogonal frequency division demultiplexing demodulation and an inverse spectrum spreading demodulation in combination. The communication coverage thereof can be expaned by making use of an orthogonal frequency division demultiplexing demodulation and an inverse spectrum spreading demodulation in combination.

22 Claims, 14 Drawing Sheets

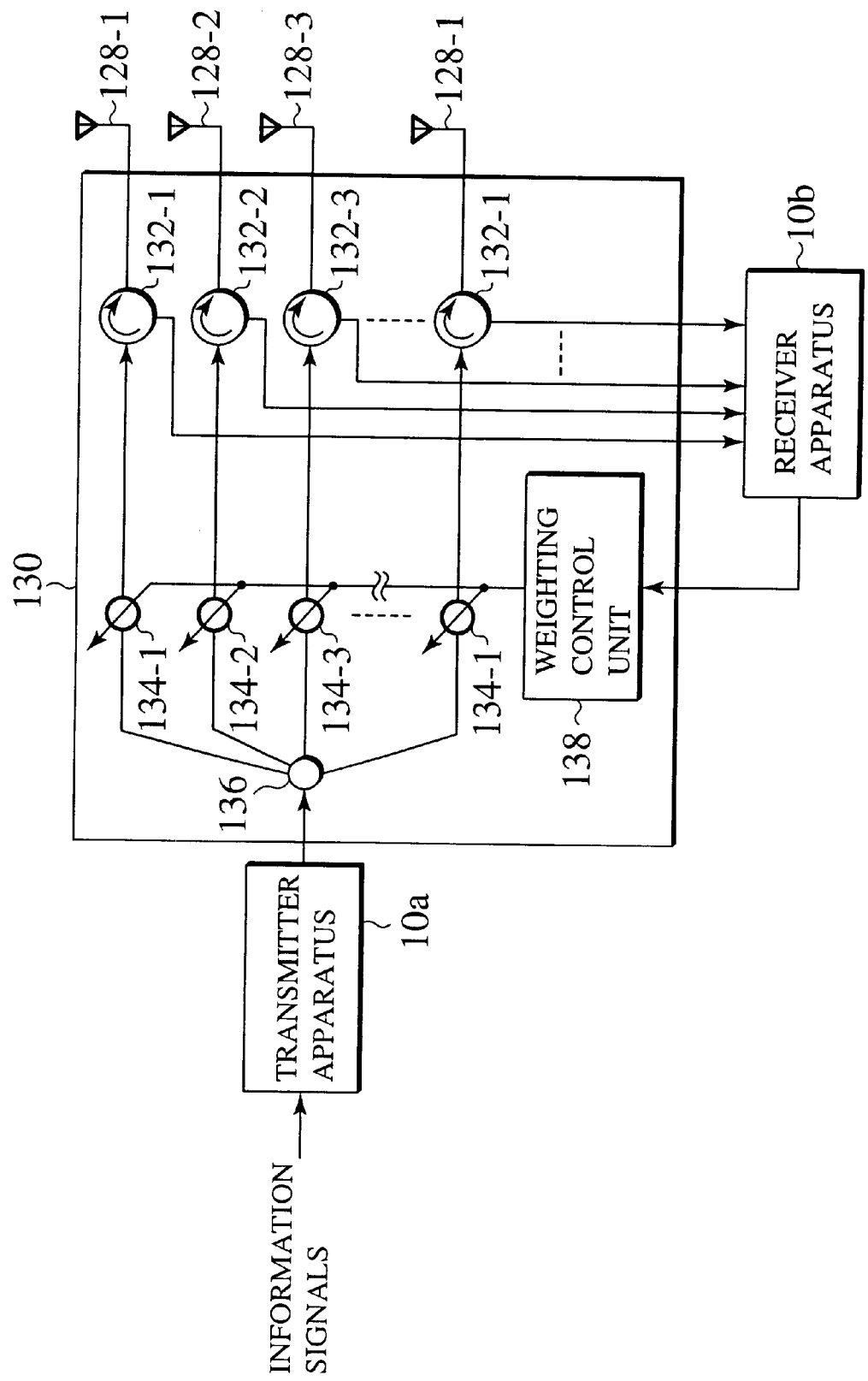

TRANSMITTER APPARATUS AND RECEIVER APPARATUS AND BASE STATION MAKING USE OF ORTHOGONAL FREQUENCY DIVISION MULTIPLEXING AND SPECTRUM SPREADING

CROSS REFERENCE TO RELATED APPLICATIONS

The subject application is related to subject matter disclosed in the Japanese Patent Application No. Hei12-54028 filed in Feb. 29, 2000 in Japan, to which the subject application claims priority under the Paris Convention and which is incorporated by reference herein.

BACKGROUND OF THE INVENTION

1. Field of the Invention

The present invention is related generally to a transmitter apparatus, a receiver apparatus and a base station implemented with the transmitter and receiver apparatuses which are communicated with each other by making use of an orthogonal frequency division demultiplexing modulation and a spectrum spreading modulation in combination.

2. Prior Art

In recent years, it becomes an important issue to cope with interference due to delay spread through multipaths while the signal transmission rates of wireless communication systems have been increased. OFDM (Orthogonal Frequency Division Multiplexing) is a technique with which the problem of the interference due to delay spread can be solved. OFDM is a block-oriented modulation scheme that maps data symbols onto a plurality of orthogonal sub-carriers separated by a distance to provide excellent resistance characteristics against the interference due to delay spread through the multipaths. Also, OFDM is capable of compacting a substantially larger number of sub-carriers, as compared with a conventional FDM (Frequency Division Multiplexing), to provide an extremely high utilization of the frequency resources. OFDM is employed as a signal transmission scheme for digital broadcast in Europe, U.S.A. and Japan, and, in addition to this, determined to be employed as part of the standard for wireless system such as HIPER-LAN/2 (Europe), IEEE802.11a (U.S.A.), MMAC (Japan) which are the next generations of the mobile communication systems.

Meanwhile, the next generations of the wireless communication system are expected to support high speed signal transmission rates in the order of several Mbps to several tens of Mbps with a wider bandwidth exclusively occupied by each channel. Because of this, it becomes furthermore important to improve the utilization of the frequency resources as compared with conventional systems. Furthermore, because of the limitation on the frequency resources as available, a technical object resides in how to determine an effective arrangement of the frequency resources and an effective arrangement of the respective cells in the cellular system.

Furthermore, the next generations of the wireless communication system are expected to support different signal transmission rates to accommodate a variety of information types for use in multimedia communications which require different levels of QoS (Quality of Service). The support for different signal transmission rates can be implemented by the use of different modulation systems and different encoding rates. Such a system capable of supporting different signal transmission rates is called as "a multi-rate supporting system" in the following description. The following table shows the relationship among the transfer speeds, the encoding rates, the modulation schema and the receiver sensitivities.

RELATIONSHIP AMONG TRANSFER SPEED, ENCODING RATE, MODULATION SCHEMA AND RECEIVER SENSITIVITIES

| MODE | TRANSFER SPEED | ENCODING RATE | MODULATION SCHEME | RECEIVER SENSITIVITY |
|---|---|---|---|---|
| M1 | 6 Mbps | BPSK | 1/2 | −82 dBm |
| M2 | 9 Mbps | BPSK | 3/4 | −81 dBm |
| M3 | 12 Mbps | QPSK | 1/2 | −79 dBm |
| M4 | 18 Mbps | QPSK | 3/4 | −77 dBm |
| M5 | 27 Mbps | 16 QAM | 9/16 | −74 dBm |
| M6 | 36 Mbps | 16 QAM | 3/4 | −70 dBm |
| M7 | 54 Mbps | 64 QAM | 3/4 | −65 dBm |

In the case of this example, there are seven modes M1 to M7 are implemented. Needless to say, a good wireless transmission condition is required for communication at a high speed transmission rate. As described in the above table, it is necessary to secure a higher reception electric field strength in order to change the transition mode from the low rate transition mode to the high rate transition mode, i.e., from the mode M1 to the mode M7. Inversely, when the transition mode is changed from the high rate transition mode to the low rate transition mode, i.e., from the mode M7 to the mode M1, the reception electric field strength as required is lowered. Namely, in the case of the multi-rate supporting system, it is possible to vary the extent (coverage) of the area (cell) to which radio waves can be effectively transmitted from one base station by changing the signal transmission rate. More specifically speaking, it is possible to expand the coverage of a cell by decreasing the signal transmission rate. Such a system capable of changing the coverage of a cell is called as "a dynamic cell structure system" in the following description.

Exemplary prior art dynamic cell structure systems are described in "Studies of Zone Generation Algorithm in Adaptive Variable Zone Structure System", Institute of Electronics, Information and Communication Engineers, B-5-204, 1998 and described in "Studies of Adaptive Variable Zone Structure System Implemented with a Directional Antenna in a Base Station", Communications Society Conference, B-5-81, 1998. In the case of these exemplary prior art techniques, it is accomplished to lessen the load on a base station due to disparity of the number of mobile stations to be linked with the base station and decrease the distance between adjacent zones utilizing the same frequency by making use of an adaptive array antenna and adaptively modifying the profile of the zone in accordance with the distribution of mobile stations.

Furthermore, another exemplary prior art dynamic cell structure system is described in "Area Configuration Method in Multi-Rate Compatible High Speed Wireless LAN", Communications Society Conference, B-5-89, 1999. The coverage of a cell is changed by modifying the zone profile in the case of the exemplary prior art technique as described above by making use of an adaptive array antenna. Contrary to this, in accordance with the above described B-5-89 reference, the coverage of a cell is changed by varying the transmission rate of the beacon signal.

The system becomes more flexible as the variable range of the coverage of a cell is increased in the dynamic cell structure system. For this reason, it is a technical issue how to expand the variable range of the coverage of a cell.

Furthermore, it is inevitable that the interference with an adjacent cell is increased while the coverage of a cell is expanded. In other words, the expansion of the coverage is closely related to the arrangement of cells in the cellular system. From this fact, there is a problem as to how to arrange cells in the dynamic zone structure.

Also, the utilization of the frequency resources has to be improved in a wireless communication system. Particularly, in the case of the wireless communication system in the next generations where the occupied signal bandwidth per channel is designed to be broad, the frequency resources as available are limited so that an appropriate system design is required to accomplish highly utilization of the frequency resources.

The intelligent antenna (smart antenna) is a wireless communication system improving the utilization of channels. The intelligent antenna technology has been explained, for example, in "Intelligent Antenna Technology", Communications Society Conference Vol.1, TB-5-1, 1999. The exemplary prior art dynamic cell structure systems as described in "Studies of Zone Generation Algorithm in Adaptive Variable Zone Structure System" and "Studies of Adaptive Variable Zone Structure System Implemented with a Directional Antenna in a Base station" are also examples of application of the intelligent antenna.

The exemplary prior art as described in "Unnecessary Waves Suppression Characteristics for Multi Carrier—CMA Adaptive Array" is an example of application of the intelligent antenna to the OFDM system. In this example, the respective signals as received through a plurality of antenna elements are appropriately weighted and then synthesized by means of a synthesizer. The signals as synthesized are converted into the signals in the frequency domain by means of FFT. The weight factor is determined on the basis of CMA (Constant Modules Algorithm) in order to make equal all the amplitudes of the respective sub-carriers. In the case where the reception electric power of the target waves is sufficiently large, the control scheme on the basis of CMA is considered to be effective.

The reception electric field strength as required is depending on the signal transmission rate in the case of the multi-rate supporting system. For this reason, it is important how to effectively control the weight factors given to an adaptive array antenna in such an environment where different coverages are given to users.

Also, in the case of such a system in which the communication range is expanded by the antenna gain as obtained by directing the beam from an adaptive array antenna to the target mobile station, it is impossible to continue communication unless the antenna is directed to the mobile station. In other words, while communication can be continued without controlling the direction of the antenna in the case where the mobile station is located within the service area, it is impossible to establish communication with a mobile station located outside of the service area unless the antenna is directed to the mobile station by beam control. The antenna is controlled in order to appropriately direct the beam on the basis of the information obtained from the received signals. Accordingly, it is impossible to obtain information necessary for taking appropriate control of the antenna in order to direct a beam to the mobile station that is located in a remote position where a communication link can be established only by securing a necessary antenna gain through the adaptive array antenna directed to that mobile station.

In this manner, the next generations of the wireless communication system are expected to support high speed signal transmission rates in the order of several Mbps to several tens of Mbps with a wider bandwidth exclusively occupied by each channel. Because of this, it becomes indispensable to improve the utilization of the frequency resources as compared with conventional systems. Furthermore, because of the limitation on the frequency resources as available, the technical object resides in the arrangement of the frequency resources and the arrangement of the respective cells in the cellular system.

Furthermore, the system becomes more flexible as the variable range of the coverage of a cell is increased in the dynamic cell structure system. For this reason, it is a technical issue to expand the variable range of the coverage of a cell. Furthermore, it is inevitable that the interference with an adjacent cell is increased while the coverage of a cell is expanded. Namely, it shall not be the case that the interference with an adjacent cell is increased while the coverage of a cell is expanded. From this fact, it is a technical issue how to arrange cells in the dynamic zone structure.

Also, it is important how to effectively control the weight factors given to an adaptive array antenna in which the utilization of the frequency resources is improved by making use of the adaptive array antenna. Furthermore, it is impossible to obtain information necessary for taking appropriate control of the antenna in order to direct a beam to the mobile station that is located in a remote position where a communication link can be established only by securing a necessary antenna gain through the adaptive array antenna directed to that mobile station. In consequence, it is an important technical problem how to determine the initial position of a remote mobile station (the initial position determination).

SUMMARY OF THE INVENTION

The present invention has been made in order to solve the shortcomings as described heretofore. It is an object of the present invention to provide a transmitter apparatus, a receiver apparatus and a base station implemented with the transmitter and receiver apparatuses in which it is possible to expand the variable range of the coverage of a cell in the dynamic cell structure system.

It is another object of the present invention to provide a transmitter apparatus, a receiver apparatus and a base station implemented with the transmitter and receiver apparatuses in which the interference between adjacent cells is effectively prevented even in the cell arrangement where the frequency resources as available are limited.

It is further object of the present invention to provide a transmitter apparatus, a receiver apparatus and a base station implemented with the transmitter and receiver apparatuses in which it is possible to obtain information necessary for taking appropriate control of the antenna in order to direct a beam to the mobile station that is located in a remote position where a communication link can be established only by securing a necessary antenna gain through the adaptive array antenna directed to that mobile station.

In brief, the above and other objects and advantages of the present invention are provided by a new and improved transmitter apparatus making use of an orthogonal frequency division multiplexing modulation and a spectrum spreading modulation in combination comprising: an orthogonal frequency division multiplexing circuit which selectively modulates information signals to be transmitted by orthogonal frequency division multiplexing; a spectrum spreading circuit which selectively performs a spectrum spreading modulation of said information signals to be transmitted; and a transmission signal processing circuit which transfers said information signals which have been modulated by either said orthogonal frequency division multiplexing modulation or said spectrum spreading modulation to a receiver apparatus as a transmission signal, wherein, when said receiver apparatus and said transmitter apparatus are located so close to each other that the received signal level of said receiver apparatus is sufficient to maintain the communication between said receiver apparatus and said transmitter apparatus with signals which are modulated on the basis of said orthogonal frequency division multiplexing modulation but not modulated on the basis of said spectrum spreading modulation, said orthogonal frequency division multiplexing circuit performs the modulation of said information signals to be transmitted while said spectrum spreading circuit does not perform said spectrum spreading modulation of said information signals to be transmitted, and wherein, when said receiver apparatus and said transmitter apparatus are located so remote from each other that the received signal level of said receiver apparatus is not sufficient to maintain the communication between said receiver apparatus and said transmitter apparatus with signals which are modulated on the basis of said orthogonal frequency division multiplexing modulation but not modulated on the basis of said spectrum spreading modulation, said orthogonal frequency division multiplexing circuit does not perform said orthogonal frequency division multiplexing modulation of said information signals to be transmitted while said spectrum spreading circuit performs said spectrum spreading modulation of said information signals to be transmitted.

In a preferred embodiment, further improvement resides in that said orthogonal frequency division multiplexing circuit is provided with a serial-to-parallel converter which converts said information signals to be transmitted from a serial data sequence to a parallel data sequence, a modulator which serves to map said parallel data as converted by said serial-to-parallel converter onto symbols in the frequency domain, an inverse fast Fourier transform unit which performs the inverse fast Fourier transformation of said information signals as mapped and a parallel-to-serial converter which converts the output data sequence of the IFFT unit 16 from a parallel data sequence to a serial data sequence.

In a preferred embodiment, further improvement resides in that said spectrum spreading circuit is provided with a spectrum spreading pattern generation circuit which generates a plurality of spectrum spreading patterns for use in said spectrum spreading modulation.

In a preferred embodiment, further improvement resides in that said transmission signal processing circuit is provided with an adaptive array antenna and wherein, when said receiver apparatus and said transmitter apparatus are located so remote from each other that the received signal level of said receiver apparatus is not sufficient to maintain the communication between said receiver apparatus and said transmitter apparatus with signals which are modulated on the basis of said orthogonal frequency division multiplexing modulation but not modulated on the basis of said spectrum spreading modulation, the direction of said receiver apparatus relative to said transmitter apparatus is detected by making use of a transmission signal which is modulated by said spectrum spreading modulation, followed by directing a beam of the adaptive array antenna to said mobile station to increase the received signal level of said receiver apparatus and make it possible to perform the communication between said receiver apparatus and said transmitter apparatus by orthogonal frequency division multiplexing.

In accordance with a further aspect of the present invention, the above and other objects and advantages of the present invention are provided by a new and improved transmitter apparatus making use of orthogonal frequency division multiplexing modulations and a spectrum spreading modulation in combination comprising: an orthogonal frequency division multiplexing circuit which performs a first orthogonal frequency division multiplexing modulation of information signals to be transmitted; a spectrum spreading circuit which selectively performs a spectrum spreading modulation of the output of said orthogonal frequency division multiplexing circuit; and a transmission signal processing circuit which transfers the output of said spectrum spreading circuit to a receiver apparatus as a transmission signal, wherein, when said receiver apparatus and said transmitter apparatus are located so close to each other that the received signal level of said receiver apparatus is sufficient to maintain the communication between said receiver apparatus and said transmitter apparatus with signals which are modulated by said first orthogonal frequency division multiplexing modulation but not modulated on the basis of said spectrum spreading modulation, said orthogonal frequency division multiplexing circuit performs said first orthogonal frequency division multiplexing modulation while said spectrum spreading circuit does not perform said spectrum spreading modulation of the output of said orthogonal frequency division multiplexing circuit, and wherein, when said receiver apparatus and said transmitter apparatus are located so remote from each other that the received signal level of said receiver apparatus is not sufficient to maintain the communication between said receiver apparatus and said transmitter apparatus with signals which are modulated by said first orthogonal frequency division multiplexing modulation but not modulated on the basis of said spectrum spreading modulation, said orthogonal frequency division multiplexing circuit performs a second orthogonal frequency division multiplexing modulation having a bandwidth which is narrower than that of said first orthogonal frequency division multiplexing modulation while said spectrum spreading circuit performs said spectrum spreading modulation of the output of said orthogonal frequency division multiplexing circuit.

In a preferred embodiment, further improvement resides in that said orthogonal frequency division multiplexing circuit serves to perform a phase shift keying modulation of said information signals.

In accordance with a further aspect of the present invention, the above and other objects and advantages of the present invention are provided by a new and improved transmitter apparatus making use of orthogonal frequency division multiplexing modulations and a spectrum spreading modulation in combination comprising: a mapping circuit which serves to map information signals to be transmitted onto symbols in the frequency domain suitable for a first orthogonal frequency division multiplexing modulation; a spectrum spreading circuit which selectively performs a spectrum spreading modulation of the output of said mapping circuit; an orthogonal frequency division multiplexing circuit which performs said first orthogonal frequency division multiplexing modulation of the output signal of said spectrum spreading circuit; and a transmission signal processing circuit which transfers the output of said orthogonal frequency division multiplexing circuit to a receiver apparatus as a transmission signal, wherein, when said receiver apparatus and said transmitter apparatus are located so close to each other that the received signal level of said receiver apparatus is sufficient to maintain the communication between said receiver apparatus and said transmitter apparatus with signals which are modulated by said first orthogonal frequency division multiplexing modulation but not modulated on the basis of said spectrum spreading modulation, said orthogonal frequency division multiplexing circuit performs said first orthogonal frequency division multiplexing modulation while said spectrum spreading circuit does not perform said spectrum spreading modulation of the output of said mapping circuit, and wherein, when said receiver apparatus and said transmitter apparatus are located so remote from each other that the received signal level of said receiver apparatus is not sufficient to maintain the communication between said receiver apparatus and said transmitter apparatus with signals which are modulated by said first orthogonal frequency division multiplexing modulation but not modulated on the basis of said spectrum spreading modulation, said orthogonal frequency division multiplexing circuit performs a second orthogonal frequency division multiplexing modulation having a bandwidth which is narrower than that of said first orthogonal frequency division multiplexing modulation while said spectrum spreading circuit performs said spectrum spreading modulation of the output of said mapping circuit.

In a preferred embodiment, further improvement resides in that said transmission signal processing circuit is provided with an adaptive array antenna and wherein, when said receiver apparatus and said transmitter apparatus are located so remote from each other that the received signal level of said receiver apparatus is not sufficient to maintain the communication between said receiver apparatus and said transmitter apparatus with signals which are modulated on the basis of said orthogonal frequency division multiplexing modulation but not modulated on the basis of said spectrum spreading modulation, the direction of said receiver apparatus relative to said transmitter apparatus is detected by making use of a transmission signal which is modulated by said spectrum spreading modulation, followed by directing a beam of the adaptive array antenna to said mobile station to increase the received signal level of said receiver apparatus and make it possible to perform the communication between said receiver apparatus and said transmitter apparatus by said first orthogonal frequency division multiplexing modulations.

In accordance with a further aspect of the present invention, the above and other objects and advantages of the present invention are provided by a new and improved receiver apparatus making use of an orthogonal frequency division demultiplexing demodulation and an inverse spectrum spreading demodulation in combination comprising: an inverse spectrum spreading circuit which selectively demodulates information signals transmitted from a transmitter apparatus and received by said receiver apparatus by performing inverse spectrum spreading demodulation of said information signals; an orthogonal frequency division demultiplexing circuit which selectively demodulates said information signals; wherein, when said receiver apparatus and said transmitter apparatus are located so close to each other that the received signal level of said receiver apparatus is sufficient to maintain the communication between said receiver apparatus and said transmitter apparatus with signals which are demodulated on the basis of said orthogonal frequency division demultiplexing demodulation but not demodulated on the basis of said inverse spectrum spreading demodulation, said orthogonal frequency division demultiplexing circuit performs the demodulation of information signals as received while said inverse spectrum spreading circuit does not perform said inverse spectrum spreading demodulation of said information signals as received, and wherein, when said receiver apparatus and said transmitter apparatus are located so remote from each other that the received signal level of said receiver apparatus is not sufficient to maintain the communication between said receiver apparatus and said transmitter apparatus with signals which are demodulated on the basis of said orthogonal frequency division multiplexing demodulation but not demodulated on the basis of said inverse spectrum spreading demodulation, said inverse spectrum spreading circuit performs said inverse spectrum spreading demodulation of said information signals as received while said orthogonal frequency division demultiplexing circuit does not perform said orthogonal frequency division demultiplexing demodulation.

In a preferred embodiment, further improvement resides in that said orthogonal frequency division demultiplexing circuit serves also to perform a phase shift keying demodulation of said information signals as received.

In accordance with a further aspect of the present invention, the above and other objects and advantages of the present invention are provided by a new and improved receiver apparatus making use of an orthogonal frequency division demultiplexing demodulation and an inverse spectrum spreading demodulation in combination comprising: an orthogonal frequency division demultiplexing circuit which demodulates information signals transmitted from a transmitter apparatus and received by said receiver apparatus on the basis of a first orthogonal frequency division demultiplexing demodulation; an inverse spectrum spreading circuit which selectively demodulates the output of said orthogonal frequency division demultiplexing circuit by performing inverse spectrum spreading demodulation of said information signals as demultiplexed; wherein, when said receiver apparatus and said transmitter apparatus are located so close to each other that the received signal level of said receiver apparatus is sufficient to maintain the communication between said receiver apparatus and said transmitter apparatus with signals which are demodulated on the basis of said first orthogonal frequency division demultiplexing demodulation but not demodulated on the basis of said inverse spectrum spreading demodulation, said orthogonal frequency division demultiplexing circuit performs said first orthogonal frequency division demultiplexing demodulation of information signals as received while said inverse spectrum spreading circuit does not perform said inverse spectrum spreading demodulation of said information signals as received, and wherein, when said receiver apparatus and said transmitter apparatus are located so remote from each other that the received signal level of said receiver apparatus is not sufficient to maintain the communication between said receiver apparatus and said transmitter apparatus with signals which are demodulated on the basis of said orthogonal frequency division multiplexing demodulation but not demodulated on the basis of said inverse spectrum spreading demodulation, said inverse spectrum spreading circuit performs said inverse spectrum spreading demodulation of said information signals as received while said orthogonal frequency division demultiplexing circuit performs a second orthogonal frequency division demultiplexing demodulation having a bandwidth which is narrower than that of said first orthogonal frequency division demultiplexing demodulation.

In accordance with a further aspect of the present invention, the above and other objects and advantages of the present invention are provided by a new and improved receiver apparatus making use of an orthogonal frequency division demultiplexing demodulation and an inverse spectrum spreading demodulation in combination comprising: an orthogonal frequency division demultiplexing circuit which selectively demodulates information signals transmitted from a transmitter apparatus and received by said receiver apparatus by performing an orthogonal frequency division demultiplexing demodulation of said information signals; an inverse spectrum spreading circuit which selectively demodulates the output of said orthogonal frequency division demultiplexing circuit by performing inverse spectrum spreading demodulation of the information signals as received; a demapping circuit which serves to selectively demap said information signals as demodulated by said orthogonal frequency division demultiplexing demodulation from symbols in the frequency domain suitable for said orthogonal frequency division demultiplexing demodulation; wherein, when said receiver apparatus and said transmitter apparatus are located so close to each other that the received signal level of said receiver apparatus is sufficient to maintain the communication between said receiver apparatus and said transmitter apparatus with signals which are demodulated on the basis of said first orthogonal frequency division demultiplexing demodulation but not demodulated on the basis of said inverse spectrum spreading demodulation, said orthogonal frequency division demultiplexing circuit performs the demodulation of information signals as received while said inverse spectrum spreading circuit does not perform said inverse spectrum spreading demodulation of said information signals as received, and wherein, when said receiver apparatus and said transmitter apparatus are located so remote from each other that the received signal level of said receiver apparatus is not sufficient to maintain the communication between said receiver apparatus and said transmitter apparatus with signals which are demodulated on the basis of said orthogonal frequency division multiplexing demodulation but not demodulated on the basis of said inverse spectrum spreading demodulation, said inverse spectrum spreading circuit performs said inverse spectrum spreading demodulation of said information signals as received while said orthogonal frequency division demultiplexing circuit does not perform said orthogonal frequency division demultiplexing demodulation.

In a preferred embodiment, further improvement resides in that said inverse spectrum spreading circuit is provided with a spectrum spreading pattern generation circuit which generates a plurality of spectrum spreading patterns for use in said inverse spectrum spreading demodulation.

In a preferred embodiment, further improvement resides in that said orthogonal frequency division demultiplexing circuit is provided with a serial-to-parallel converter which converts the information signals as received from a serial data sequence to a parallel data sequence and a fast Fourier transform unit which performs the fast Fourier transformation of said information signals as converted to said parallel data sequence.

In a preferred embodiment, further improvement resides in that said inverse spectrum spreading circuit makes use of different spectrum spreading patterns for different transmitter apparatuses.

In accordance with a further aspect of the present invention, the above and other objects and advantages of the present invention are provided by a new and improved base station which serves to establish communication with at least one mobile station located in a communication area where said base station is responsible for communication by making use of an orthogonal frequency division multiplexing modulation and a spectrum spreading modulation in combination comprising: a transmitter apparatus capable of transmitting information signals in a first transmission mode which has a first transmission speed and a first gain and transmitting information signals in a second transmission mode which has a second transmission speed which is lower than said first transmission speed and a second gain which is greater than said first gain; a receiver apparatus capable of receiving a first reception mode which receives information signals having been transmitted in said first transmission mode and receiving a second reception mode which receives information signals having been transmitted in said second transmission mode; wherein, when said mobile station and said base station are located so close to maintain communication between said mobile station and said base station in said first transmission mode and said first reception mode, said base station maintains communication between said mobile station and said base station in said first transmission mode and said first reception mode, wherein, when said mobile station and said base station are located too remote to maintain communication between said mobile station and said base station in said first transmission mode and said first reception mode, said base station establishes communication between said mobile station and said base station in said second transmission mode and said second reception mode.

In a preferred embodiment, further improvement resides in that said base station makes use of said second transmission mode and said second reception mode for communication with a mobile station which is located in an overlapping area between said communication area where said base station is responsible for communication and an adjacent area where an adjacent base station is responsible for communication.

In a preferred embodiment, further improvement resides in that said base station and an adjacent base station thereto share the same communication resources for said first transmission mode and said first reception mode respectively and make use of separate communication resources for said second transmission mode and said second reception mode respectively.

In a preferred embodiment, further improvement resides in that said base station is provided with an adaptive array antenna and wherein, when said mobile station and said base station are located so remote from each other that the received signal level of said base station is not sufficient to maintain the communication between said mobile station and said base station in said first transmission mode and said first reception mode, said base station establishes communication with said mobile station in said second transmission mode and said second reception mode, detects the direction of said mobile station relative to said base station, directing a beam of the adaptive array antenna to said mobile station in order to improve the gain in said first transmission mode and said first reception mode, and then establishing communication with said mobile station in said first transmission mode and said first reception mode.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 14 is a block diagram showing the configuration of the antenna system for signal transmission in accordance with the fourth embodiment of the present invention.

DETAILED DESCRIPTION OF EMBODIMENTS

Figure 1:
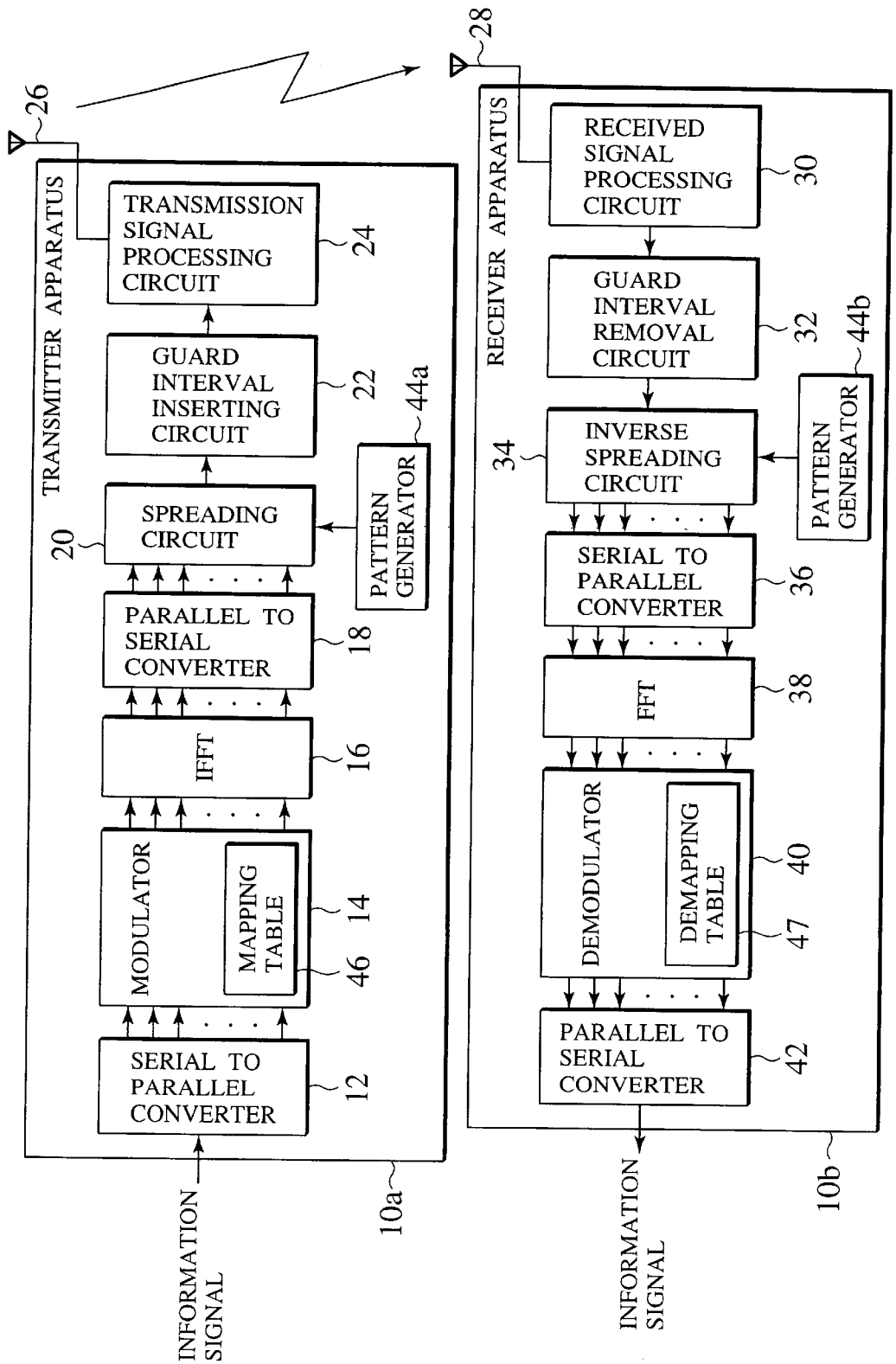
FIG. 1 is a block diagram showing a transmitter apparatus and a receiver apparatus in accordance with a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(First Embodiment)

FIG. 1 is a block diagram showing a transmitter apparatus and a receiver apparatus in accordance with a first embodiment of the present invention. The transmitter apparatus and the receiver apparatus in accordance with the present invention are provided for wireless communication by the use of OFDM (Orthogonal Frequency Division Multiplexing).

As illustrated in FIG. 1, the transmitter apparatus 10a in accordance with the first embodiment of the present invention is composed of a serial-to-parallel converter 12 for converting the information signals (data stream) to be transmitted from a serial data sequence to a parallel data sequence, a modulator 14 for mapping the parallel data as outputted from the serial-to-parallel converter 12 onto symbols in the frequency domain, an IFFT (Inverse Fast Fourier Transform) unit 16 for converting the signals in the frequency domain as outputted from the modulator 14 to the signals in the time domain, a parallel-to-serial converter 18 for converting the output data sequence of the IFFT unit 16 from a parallel data sequence to a serial data sequence, a spectrum spreading circuit 20 for spectrum spreading the output signals of the parallel-to-serial converter 18, a guard interval inserting circuit 22 for inserting guard intervals which are timely gaps to the output signals of the spectrum spreading circuit 20 for the purpose of preventing interference due to multipaths, a transmission signal processing circuit 24 for performing necessary processes required to transmit the output signals of the guard interval inserting circuit 22 as radio signals, an antenna 26 for radiating the output signals of the transmission signal processing circuit 24 as electric waves. The transmission signal processing circuit 24 serves to perform the conversion of input signals from digital signals to analog signals, the conversion of the frequencies of signals to appropriate frequencies for wireless communication, the amplification of signal levels to sufficient levels and so forth.

Also, the transmitter apparatus 10a in accordance with the first embodiment has a pattern generation circuit 44a provided in the spectrum spreading circuit 20 for generating spectrum spreading signals (spectrum spreading pattern) which are multiplied by the output signals of the parallel-to-serial converter 18 when the spectrum spreading circuit 20 performs spectrum spreading, and a mapping table 46 provided in the modulator 14 for storing numbers to be mapped corresponding to the parallel data as outputted from the serial-to-parallel converter 12. Not shown in the figure, the transmitter circuit 10a is provided with a control circuit for taking control of the spectrum spreading circuit 20 as to whether or not spectrum spreading is performed. The control circuit serves to output an appropriate control signal to the spectrum spreading circuit 20 in order to take control of the spectrum spreading process by the spectrum spreading circuit 20.

On the other hand, the receiver apparatus 10b in accordance with the first embodiment of the present invention is composed of an antenna 28 for receiving radio waves as radiated from the transmitter apparatus 10a, a received signal processing circuit 30 for performing processes to convert radio frequency signals to corresponding baseband signals, a guard interval removal circuit 32 for removing the guard intervals in synchronism with the timing information as obtained from the decoded signals, an inverse spectrum spreading circuit 34 for inverse spectrum spreading the output signals of the guard interval removal circuit 32, a serial-to-parallel converter 36 for converting the output signals of the spectrum spreading circuit 34 from a serial data sequence to a parallel data sequence, an FFT (Fast Fourier Transform) unit 38 for converting the parallel data as output from the serial-to-parallel converter 36 from signals in the time domain to signals in the frequency domain, a demodulator unit 40 for demapping the signals as outputted from the FFT unit 38 in the frequency domain, and a parallel-to-serial converter 42 for converting the output signals of the demodulator unit 40 from a parallel data sequence to a serial data sequence.

Furthermore, the receiver apparatus 10b in accordance with the first embodiment is composed of the pattern generation circuit 44b provided in the inverse spectrum spreading circuit 34 for generating the identical patterns as used by the spectrum spreading circuit 20 of the transmitter apparatus 10a, and a demapping table 47 provided in the demodulator unit 40 for storing the identical numbers as stored in the mapping table 46 of the transmitter apparatus 10a. Although not shown in the figure, like the above described the transmitter apparatus 10a, the receiver circuit 10b is provided with a control circuit for taking control of the inverse spectrum spreading circuit 34 as to whether or not inverse spectrum spreading is performed. This control circuit serves to output an appropriate control signal to the inverse spectrum spreading circuit 34 in order to take control of the inverse spectrum spreading process by the inverse spectrum spreading circuit 34.

Figure 2:
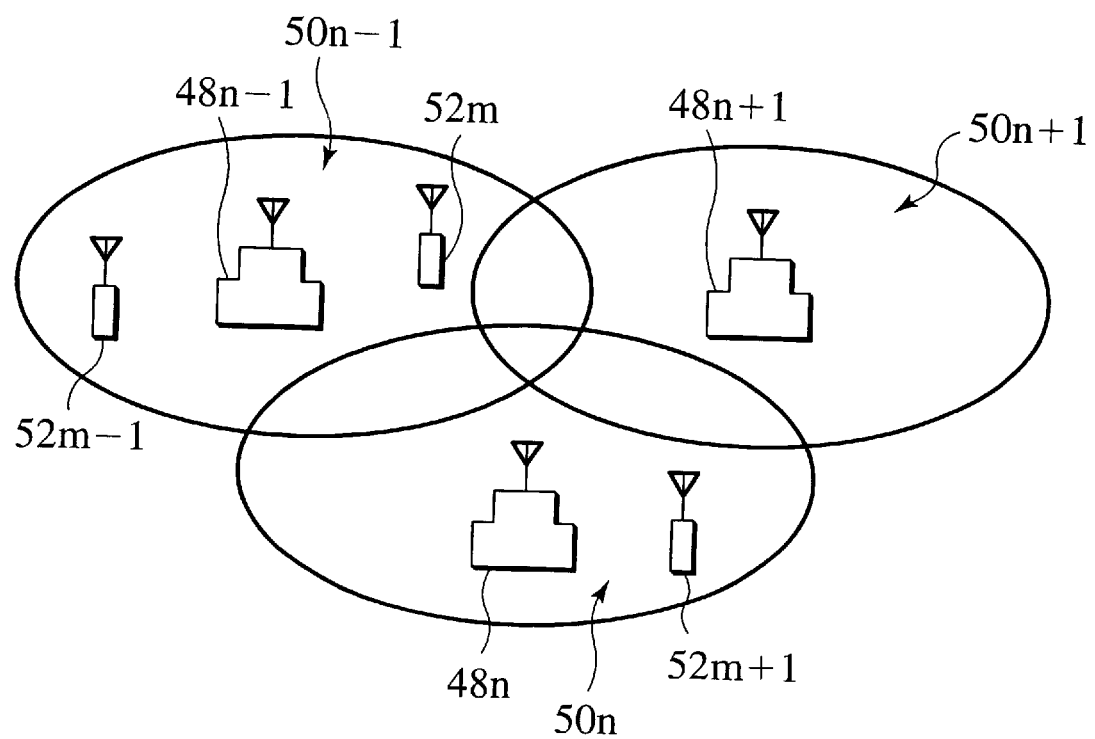
FIG. 2 is a schematic diagram showing an exemplary configuration of cells in accordance with the conventional cellular system.

Next, the configuration of cells and burst frames in accordance with the first embodiment of the present invention will be explained. First, the configuration of cells and burst frames in accordance with the conventional cellular system will be explained. FIG. 2 is a schematic diagram showing an exemplary configuration of cells in accordance with the conventional cellular system. As illustrated in FIG. 2, in the case of the conventional cellular system, a plurality of base stations 48n−1, 48n and 48n+1 are located in the service area covered by cells 50n−1, 50n and 50n+1 in which radio waves are effectively propagated from the respective base stations 48n−1, 48n and 48n+1. The base stations 48n−1, 48n and 48n+1 are responsible for resource management of wireless frequencies and so forth within the respective cells 50n−1, 50n and 50n+1. Furthermore, there are a plurality of mobile stations 52m−1, 52m and 52m+1 in the service area. The respective base stations 48n−1, 48n and 48n+1 and the respective mobile stations 52m−1, 52m and 52m+1 are provided with usual transmitter apparatuses and receiver apparatuses.

The so-called cellular system is such a system in which wireless resources are allocated to the respective base stations 48n−1, 48n and 48n+1 and the respective mobile stations 52m−1, 52m and 52m+1. The timing control of the signals for use in the communication system is depending upon the channel allocation algorithm which is employed in the communication system.

Figure 3:
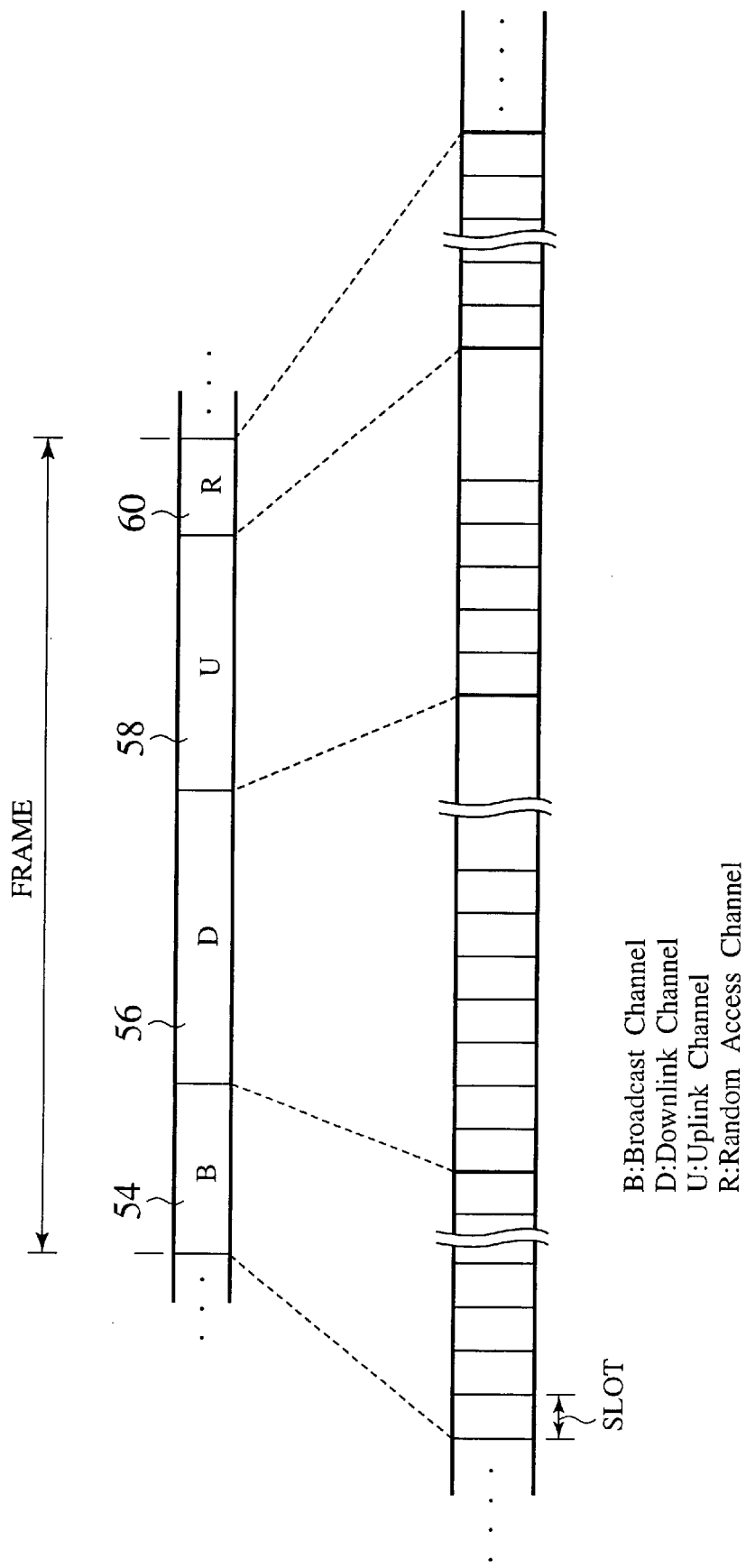
FIG. 3 is a schematic diagram showing an exemplary configuration of the burst frame for the TDMA system in which time slots are allocated to the respective channels by timely division for multiplexing.

FIG. 3 is a schematic diagram showing an exemplary configuration of the burst frame for the TDMA system in which time slots are allocated to the respective channels by timely division for multiplexing. In FIG. 3, the abscissa is indicative of time. The burst frame as illustrated in FIG. 3 consists of a broadcast channel 54 through which common information is broadcasted from a base station to all the mobile stations linked to the base station, a downlink channel 56 through which information items exclusive to the respective mobile stations are transfered from the base station to the individual mobile stations, an uplink channel 58 through which information items are transfered from the respective mobile stations to the base station, and a random access channel 60 through which a mobile station can transfer a request for allocation of wireless resources to the base station. The respective channels 54, 56, 58 and 60 are composed of a plurality of slots respectively.

The mobile station located within the service area is in communication with the base station through predetermined slots in the downlink channel 56 and the uplink channel 58 which have been allocated to the mobile station by the base station. In many prior art cellular systems, the modulation scheme and the signal transmission rate for use in communications between the base station and the respective mobile stations are fixed in advance. For example, in the case of the PHS system, the modulation scheme and the signal transmission rate for use therein have been defined as quadrature phase shift keying (QPSK) modulation and 32 kbps respectively. Contrary to this, the next generations of the wireless communication system are designed to support different signal transmission rates to accommodate a variety of information types for use in multimedia communications which require different levels of QoS (Quality of Service). More specifically speaking, the support for different signal transmission rates can be implemented by the use of different modulation systems and different encoding rates. Namely, the multi-rate supporting system is employed in the next generations of the wireless communication system.

The multi-rate supporting system serves to accommodate users requiring different signal transmission rates and therefore particularly fitted for multimedia information. Also, since an appropriate signal transmission rate can be used in accordance with the wireless communication environment, the utilization of the frequency resources can be improved. Furthermore, the coverage of a cell can be varied by changing the signal transmission rate. The system becomes more flexible as the variable range of the coverage of a cell is increased in the dynamic cell structure system. For this reason, it is a technical issue to expand the variable range of the coverage of a cell as explained in the prior art technique.

Figure 4:
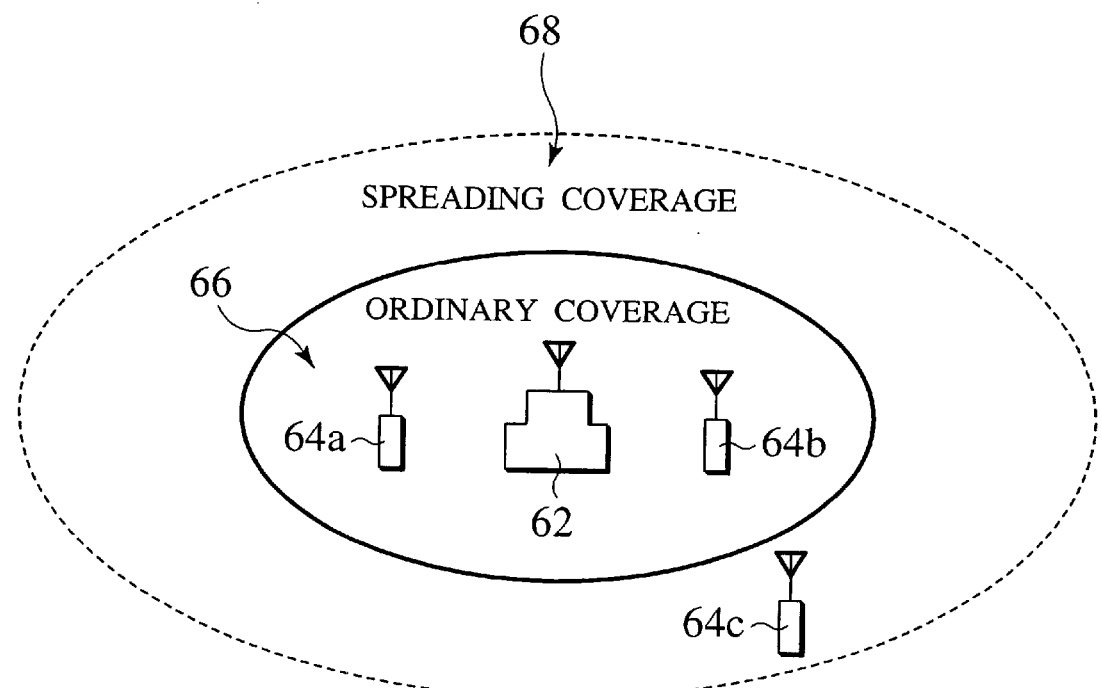
FIG. 4 is an explanatory view for explaining the coverage of the cell of the base station in accordance with the first embodiment of the present invention.

Next, the cell configuration around a base station in accordance with the first embodiment of the present invention will be explained in conjunction with FIG. 4. FIG. 4 is an explanatory view for explaining the coverage of the cell of the base station in accordance with the first embodiment of the present invention. As illustrated in FIG. 4, the base station 62 of the first embodiment of the present invention serves to provide an ordinary coverage 66 and a spreading coverage 68. The base station 62 performs conventional OFDM in the ordinary coverage 66 in which the mobile stations 64a and 64b maintain communication with the base station 62 on the basis of the OFDM. Furthermore, the base station 62 serves to provide the spreading coverage 68 surrounding the ordinary coverage 66 for performing conventional OFDM, and can establish communication with a mobile station 64c located outside of the ordinary coverage 66 but inside of the spreading coverage 68.

As illustrated in FIG. 1, the transmitter apparatus 10a in accordance with the first embodiment of the present invention is provided with the spectrum spreading circuit 20 between the parallel-to-serial converter 18 and the guard interval inserting circuit 22 while the receiver apparatus 10b is provided with the inverse spectrum spreading circuit 34 between the guard interval removal circuit 32 and the serial-to-parallel converter 36. The spectrum spreading circuit 20 of the transmitter apparatus 10a serves to spread the respective transmission signals by multiplying the transmission signals by a pattern as generated by the pattern generation circuit 44a. On the other hand, the spectrum spreading circuit 34 serves to inverse spread the respective received signals by multiplying the received signals as spectrum spread by a pattern as generated by the pattern generation circuit 44b. The pattern as generated by the pattern generation circuit 44a for the multiply operation is identical to the pattern as generated by the pattern generation circuit 44b for the multiply operation.

Figure 5:
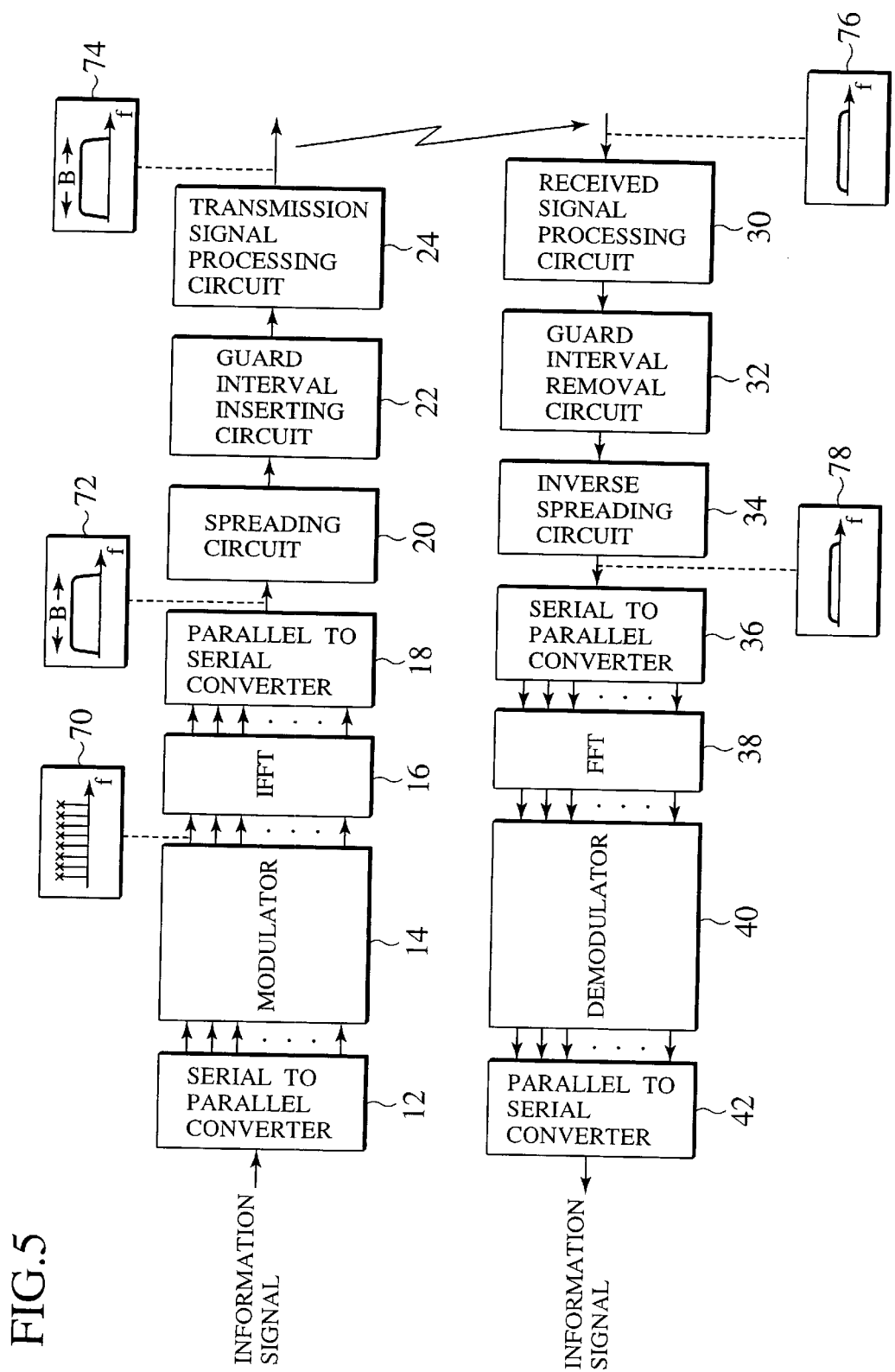
FIG. 5 is explanatory view for explaining the processing of the signals by the transmitter apparatus and the receiver apparatus as illustrated in FIG. 1 in the case where the spectrum spreading operation is not performed as well as the inverse spectrum spreading operation.
Figure 6:
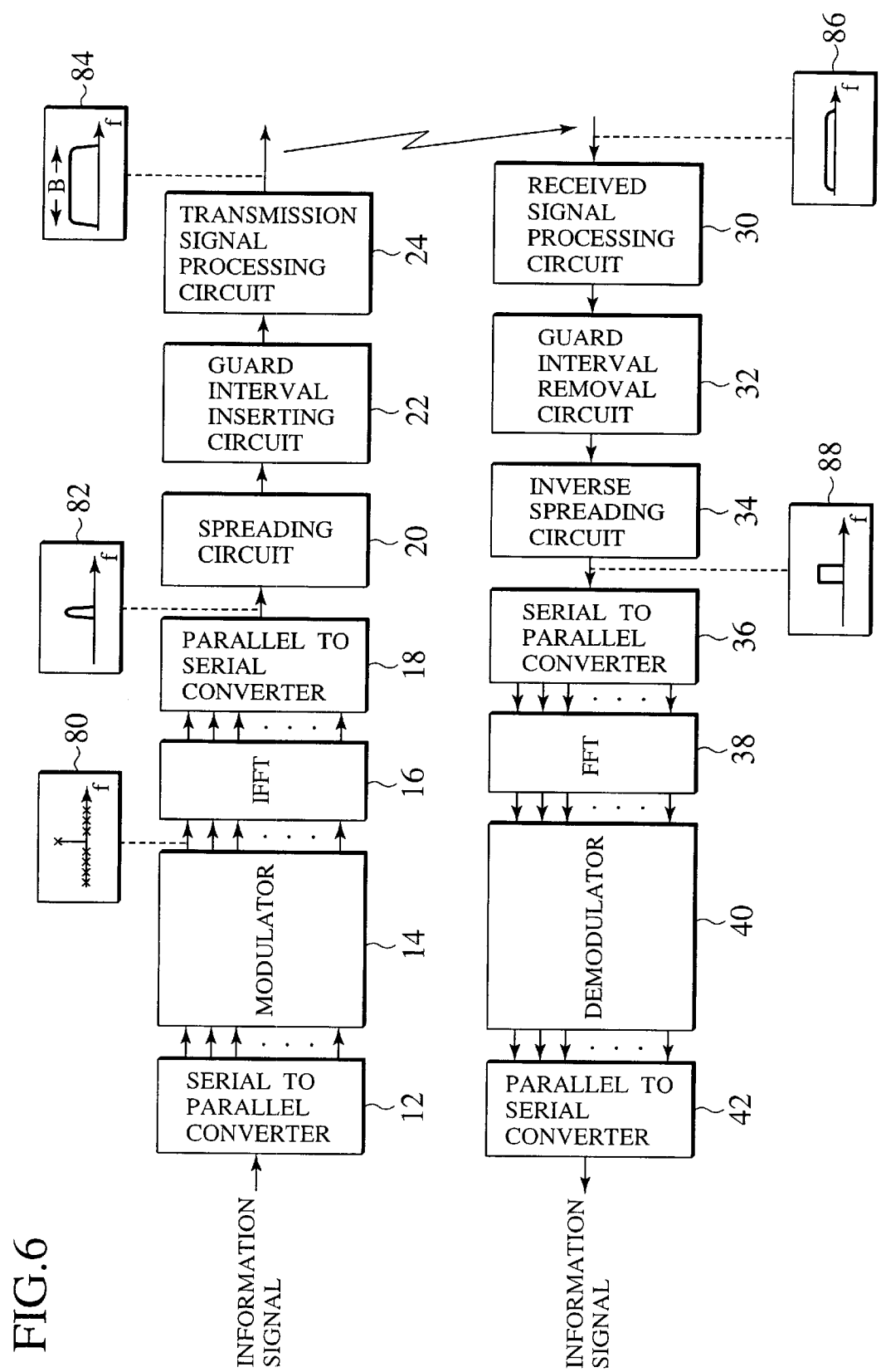
FIG. 6 is explanatory view for explaining the processing of the signals by the transmitter apparatus and the receiver apparatus as illustrated in FIG. 1 in the case where the spectrum spreading operation is performed as well as the inverse spectrum spreading operation.

FIG. 5 and FIG. 6 are explanatory views for explaining the processing of the signals in the transmitter apparatus 10a and the receiver apparatus 10b as illustrated in FIG. 1. FIG. 5 is explanatory view for explaining the processing of the signals in the case where the spectrum spreading operation is not performed as well as the inverse spectrum spreading operation. FIG. 6 is explanatory view for explaining the processing of the signals in the case where the spectrum spreading operation is performed as well as the inverse spectrum spreading operation. The case where the spectrum spreading operation is not performed as well as the inverse spectrum spreading operation is such a case where the receiver apparatus and the transmitter apparatus are located so close to each other that the receiver sensitivity is sufficient to maintain the communication between the receiver apparatus and the transmitter apparatus by means of OFDM without spectrum spreading. Also, the case where the spectrum spreading operation is performed as well as the inverse spectrum spreading operation is such a case where the receiver apparatus and the transmitter apparatus are located so remote from each other that the receiver sensitivity is not sufficient to establish the communication between the receiver apparatus and the transmitter apparatus by means of OFDM without spectrum spreading. As illustrated in FIG. 5, in the case without spectrum spreading, the transmitter apparatus 10a serves to generate conventional OFDM signals. More specifically speaking, the conventional OFDM signals are generated by mapping data symbols onto the complex plane in the frequency domain (see spectral components 70) by means of the modulator 14 of the transmitter apparatus 10a, and converting the data symbols as mapped to signals in the time domain by means of the IFFT unit 18. The OFDM signals are generated to effectively occupy the entirety of the available bandwidth. In this case, the spectrum spreading circuit 20 serves to output the input signals without change so that the transmitter apparatus 10a then outputs the signals with spectra 74.

As illustrated in FIG. 6, also in the case where spectrum spreading is performed, the transmitter apparatus 10a serves to generate OFDM signals. However, the modulator 14 serves to decrease the number of the data symbols as mapped onto the complex plane in the frequency domain (see spectral components 80). In this case, only one subcarrier is modulated while NULL is assigned to the remaining sub-carriers. OFDM is therefore not performed in fact in this case. Accordingly, the OFDM signals as converted in the time domain by the IFFT unit 16 has spectral components 82. If the number of the available sub-carriers of the OFDM signals is N, 1/N of the available bandwidth is used by the spectral components 82. Accordingly, the transfer speed is also decreased by 1/N. The spectrum spreading circuit 20 then multiplies the input signals by a predetermined pattern (s). The transmission signal processing circuit 24 serves to amplify the signals to a sufficient power level and output the amplified signals. Accordingly, the transmitter apparatus 10a outputs the OFDM has spectrum spread with the spectral components 84 of which effective bandwidth is equal to that of the spectral components 74 as illustrated in FIG. 5.

On the other hand, the receiver apparatus 10b usually skips the inverse spectrum spreading process, but only when communication can not be established, it performs the inverse spectrum spreading process in advance of demodulation. As illustrated in FIG. 6, when the inverse spectrum spreading process is performed, the inverse spectrum spreading circuit 34 of the receiver apparatus 10b serves to switch the inverse spreading pattern among from a plurality of predetermined patterns to search the inverse spreading pattern, that is identical to the spreading pattern having been used in the transmitter apparatus 10a, for inverse spreading the received signals (see the spectral components 86). The inverse spectrum spreading circuit 34 then performs the inverse spectrum spreading process of the received signals by the use of the inverse spreading pattern identical to the spreading pattern having been used in the transmitter apparatus 10a. Accordingly, the inverse spectrum spreading circuit 34 outputs the signals with spectral components 88. The spectral components 88 is corresponding to the spectral components 78 in the case where the inverse spectrum spreading operation is not performed.

In accordance with the first embodiment of the present invention, the receiver sensitivity can be improved by the spectrum spreading gain since the OFDM signals are spectrum spread at the transmitter apparatus and spectrum de-spread at the receiver apparatus. Because of this, it is possible to expand the variable range of the coverage of a cell in the dynamic cell structure system.

Furthermore, in accordance with the first embodiment of the present invention, it is possible to implement the transmitter/reception apparatus only by partly modifying an existing system and therefore to reduce the initial cost as required when the new system is introduced.

(Second Embodiment)

Figure 7:
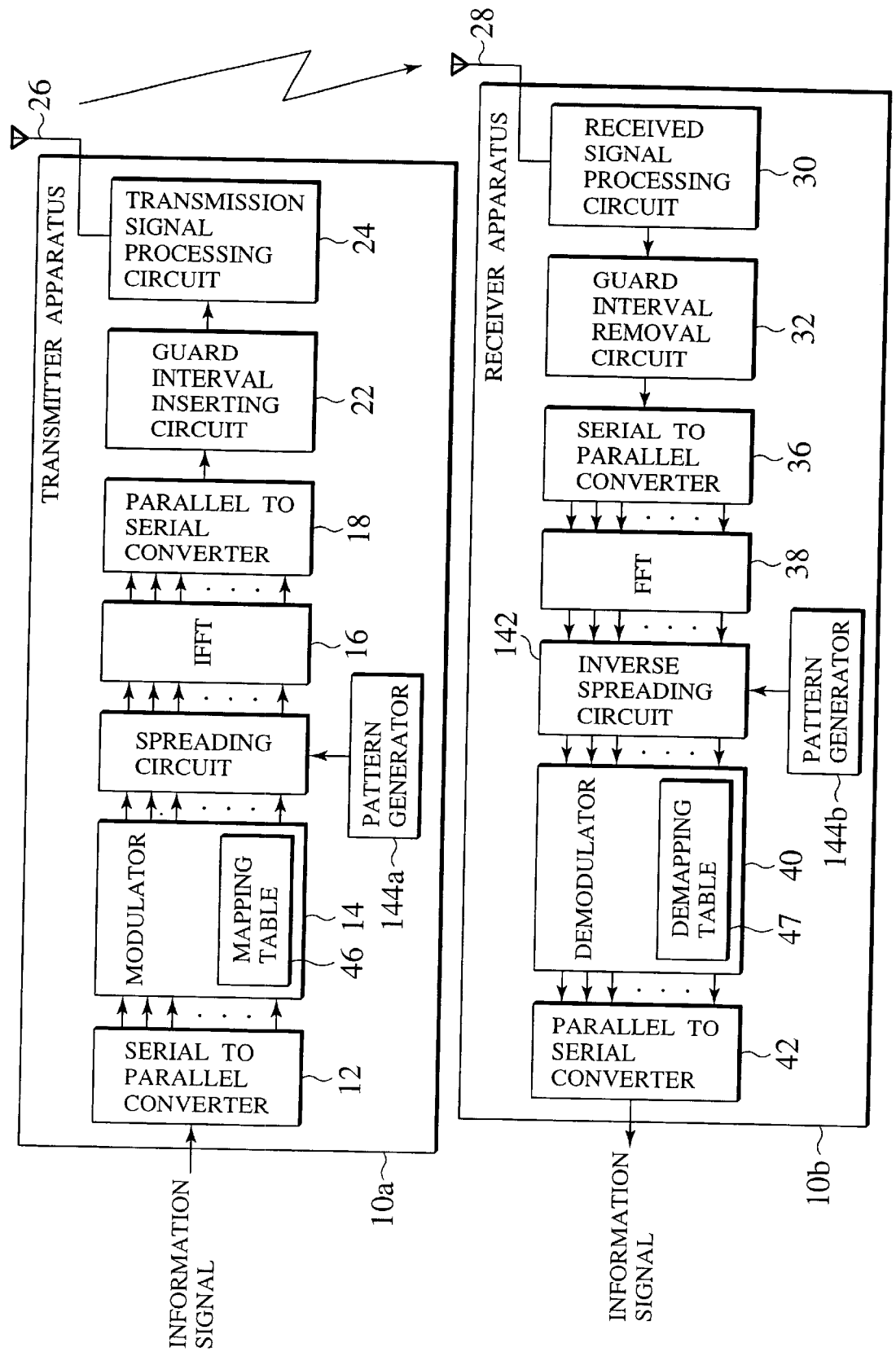
FIG. 7 is a block diagram showing a transmitter apparatus and a receiver apparatus in accordance with a second embodiment of the present invention.

FIG. 7 is a block diagram showing a transmitter apparatus and a receiver apparatus in accordance with a second embodiment of the present invention. The transmitter apparatus and the receiver apparatus in accordance with the present invention are provided for wireless communication by the use of the OFDM technique in the same manner as the first embodiment. In the case of the first embodiment of the present invention, the OFDM modulation and the spectrum spreading process are not performed to the same signals in combination. However, in the case of the present embodiment, the OFDM modulation and the spectrum spreading process are performed to the same signals.

Also, the first embodiment of the present invention, the signals in the frequency domain are spectrum spread or inverse spectrum spread. Accordingly, the spectrum spreading circuit 20 as illustrated in FIG. 1 is connected between the parallel-to-serial converter 18 and the guard interval inserting circuit 22 while the inverse spectrum spreading circuit 34 is connected between the guard interval removal circuit 32 and the serial-to-parallel converter 36. However, the spectrum spreading process and the inverse spectrum spreading process are linear operations and can be performed in the time domain. In accordance with the present embodiment, the spectrum spreading process and the inverse spectrum spreading process are performed in the time domain.

As illustrated in FIG. 7, the transmitter apparatus 10a in accordance with the second embodiment of the present invention is composed of a serial-to-parallel converter 12 for converting the information signal (data stream) to be transmitted from a serial data sequence to a parallel data sequence, a modulator 14 for mapping the parallel data as outputted from the serial-to-parallel converter 12 onto symbols in the frequency domain, a spectrum spreading circuit 140 for spectrum spreading the output signals of the modulator 14, an IFFT (Inverse Fast Fourier Transform) unit 16 for converting the signals in the frequency domain as outputted from the spectrum spreading circuit 140 to the signals in the time domain, a parallel-to-serial converter 18 for converting the output data sequence of the IFFT unit 16 from a parallel data sequence to a serial data sequence, a guard interval inserting circuit 22 for inserting guard intervals which are timely gaps to the output signals of the parallel-to-serial converter 18 for the purpose of preventing interference due to multipaths, a transmission signal processing circuit 24 for performing necessary processes required to transmit the output signals of the guard interval inserting circuit 22 as radio signals, an antenna 26 for radiating the output signals of the transmission signal processing circuit 24 as electric waves. The transmission signal processing circuit 24 serves to perform the conversion of input signals from digital signals to analog signals, the conversion of the frequencies of the signals to appropriate frequencies for wireless communication, the amplification of signal levels to sufficient levels and so forth.

Furthermore, the transmitter apparatus 10a in accordance with the second embodiment is provided with a pattern generation circuit 144a in the spectrum spreading circuit 140 for generating spectrum spreading signals (spectrum spreading patterns) which are multiplied by the output signals of the modulator 14 when the spectrum spreading circuit 140 performs spectrum spreading, and a mapping table 46 provided in the modulator 14 for storing numbers to be mapped corresponding to the parallel data as outputted from the serial-to-parallel converter 12. Not shown in the figure, the transmitter circuit 10a is provided with a control circuit for taking control of the spectrum spreading circuit 140 as to whether or not spectrum spreading is performed. The control circuit serves to output an appropriate control signal to the spectrum spreading circuit 140 in order to take control of the spectrum spreading process by the spectrum spreading circuit 140.

On the other hand, the receiver apparatus 10b in accordance with the second embodiment of the present invention is composed of an antenna 28 for receiving radio waves as radiated from the transmitter apparatus 10a, a received signal processing circuit 30 for performing processes to convert radio frequency signals to corresponding baseband signals, a guard interval removal circuit 32 for removing the guard intervals in synchronism with the timing information as obtained from the decoded signals, a serial-to-parallel converter 36 for converting the output signals of the guard interval removal circuit 32, an FFT (Fast Fourier Transform) unit 38 for converting the parallel data as output from the serial-to-parallel converter 36 from signals in the time domain to signals in the frequency domain, an inverse spectrum spreading circuit 34 for inverse spectrum spreading the output signals of the FFT unit 38, a demodulator unit 40 for demapping the signals as outputted from the inverse spectrum spreading circuit 142 in the frequency domain, and a parallel-to-serial converter 42 for converting the output signals of the demodulator unit 40 from a parallel data sequence to a serial data sequence.

Furthermore, the receiver apparatus 10b in accordance with the second embodiment is composed of the pattern generation circuit 44b provided in the inverse spectrum spreading circuit 142 for generating the identical patterns as used by the spectrum spreading circuit 140 of the transmitter apparatus 10a, and a demapping table 47 provided in the demodulator unit 40 for storing the identical numbers as stored in the mapping table 46 of the transmitter apparatus 10a. Although not shown in the figure, like the above described the transmitter apparatus 10a, the receiver circuit 10b is provided with a control circuit for taking control of the inverse spectrum spreading circuit 142 as to whether or not inverse spectrum spreading is performed. This control circuit serves to output an appropriate control signal to the inverse spectrum spreading circuit 142 in order to take control of the inverse spectrum spreading process by the inverse spectrum spreading circuit 142.

Figure 8:
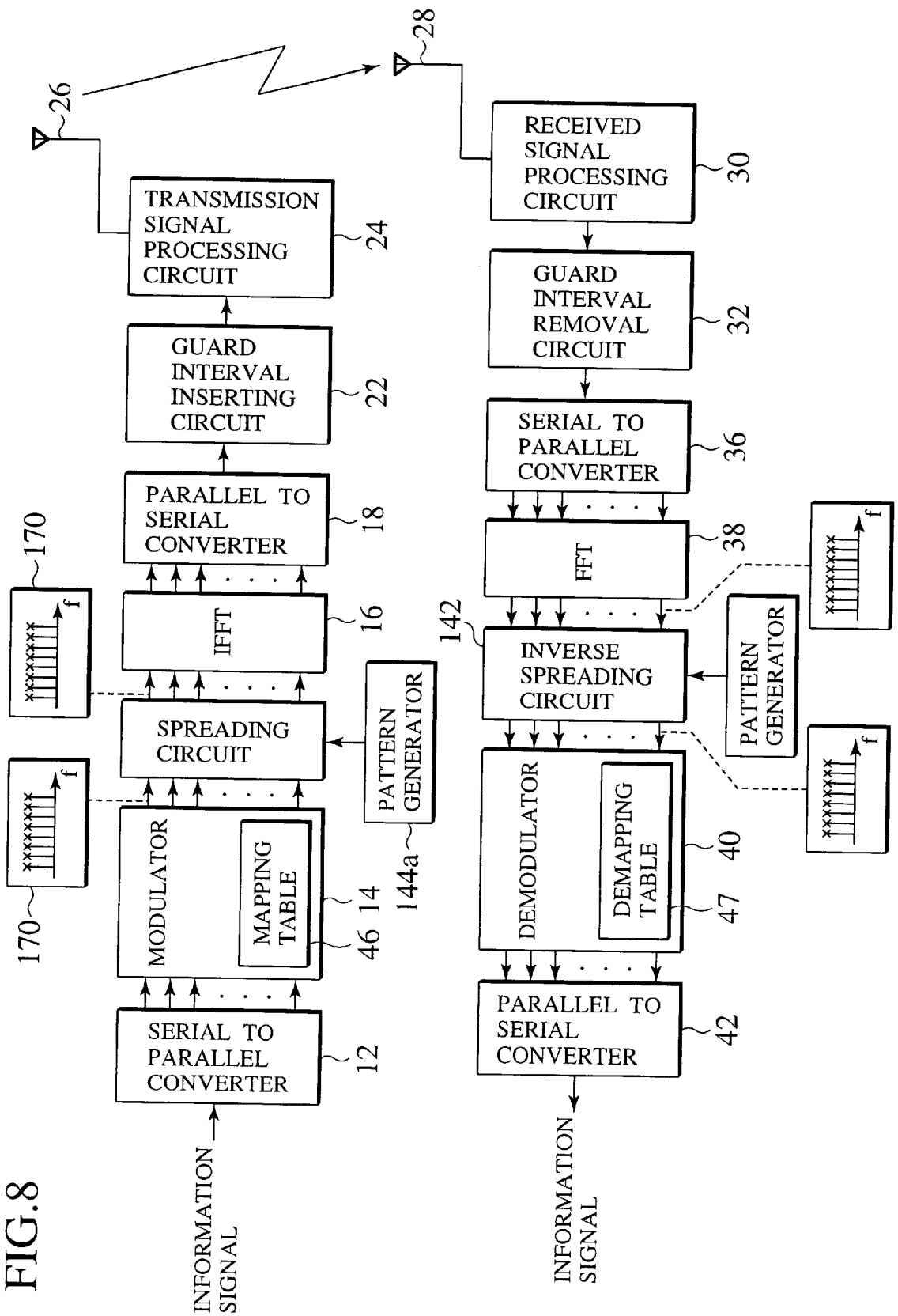
FIG. 8 is explanatory view for explaining the processing of the signals by the transmitter apparatus and the receiver apparatus as illustrated in FIG. 7 in the case where the spectrum spreading operation is not performed as well as the inverse spectrum spreading operation.
Figure 9:
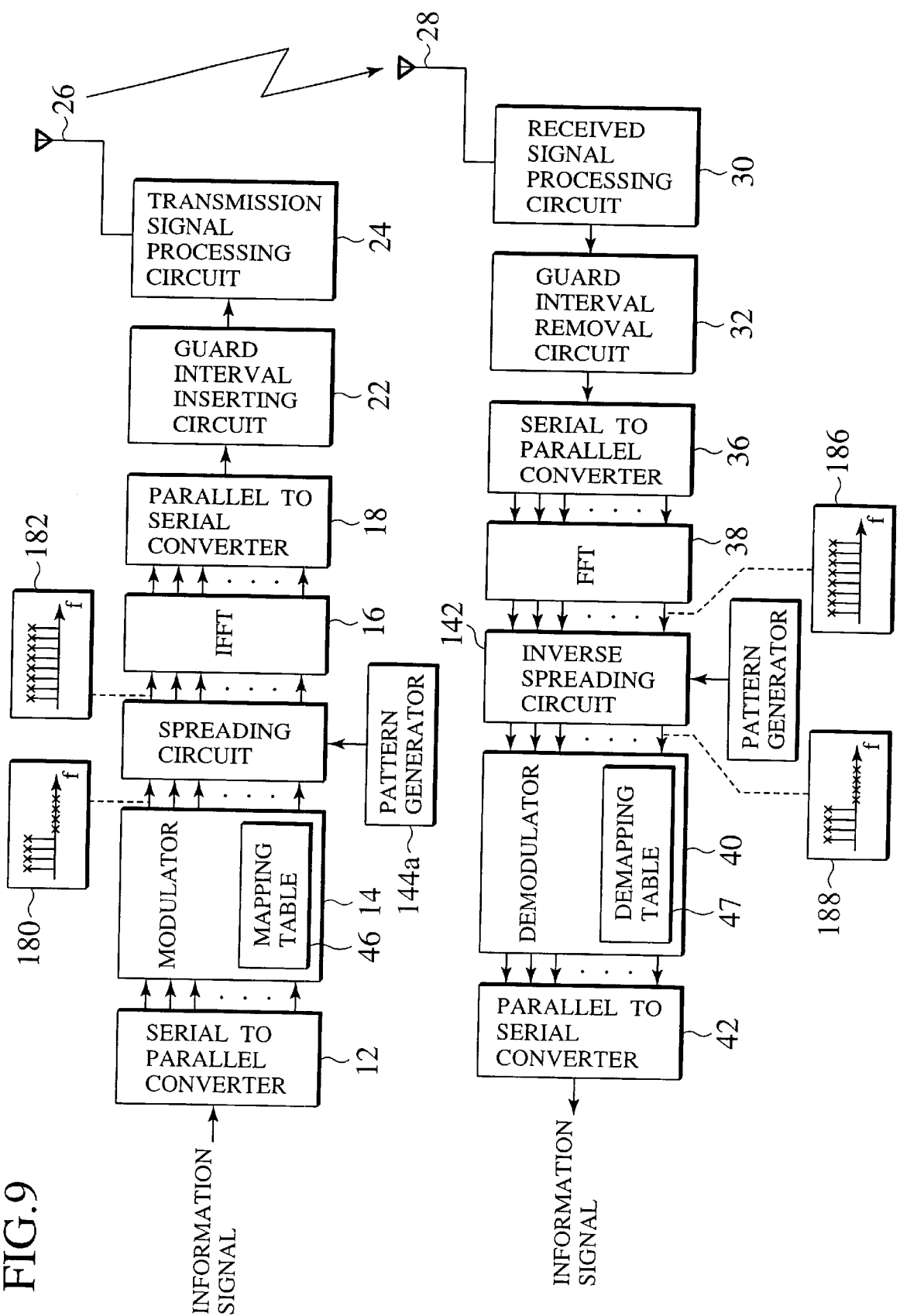
FIG. 9 is explanatory view for explaining the processing of the signals by the transmitter apparatus and the receiver apparatus as illustrated in FIG. 7 in the case where the spectrum spreading operation is performed as well as the inverse spectrum spreading operation.

FIG. 8 and FIG. 9 are explanatory views for explaining the processing of the signals in the transmitter apparatus 10a and the receiver apparatus 10b as illustrated in FIG. 7. FIG. 8 is explanatory view for explaining the processing of the signals in the case where the spectrum spreading operation is not performed as well as the inverse spectrum spreading operation. FIG. 9 is explanatory view for explaining the processing of the signals in the case where the spectrum spreading operation is performed as well as the inverse spectrum spreading operation. As illustrated in FIG. 8, in the case without spectrum spreading, the transmitter apparatus 10a serves to generate conventional OFDM signals. More specifically speaking, the conventional OFDM signals are generated by mapping data symbols onto the complex plane in the frequency domain by means of the modulator 14 of the transmitter apparatus 10a, and passed through the spectrum spreading circuit 140 without change (see spectral components 170). The IFFT unit 18 then converts the signals in the frequency domain which are not spectrum spread to signals in the time domain. The OFDM signals as generated occupy the entirety of the available bandwidth.

As illustrated in FIG. 9, the transmitter apparatus 10a serves to generate the OFDM signals with orthogonal frequency waves even when they are spectrum spread. However, the modulator 14 serves to decrease the number of the data symbols as mapped onto the complex plane in the frequency domain (see spectral components 180). In this case, only four sub-carriers are modulated while NULL is assigned to the remaining sub-carriers. Accordingly, the OFDM signal as output from the modulator 14 has the spectral components 180. If the number of all the sub-carriers is 64, the bandwidth occupied by the spectral components 180 of the four effective sub-carriers is ¹⁄₁₆ of the entirety of the available bandwidth. Furthermore, the spectrum spreading circuit 20 serves to multiply the input signals by a predetermined pattern. Accordingly, the output signals of the spectrum spreading circuit 20 have the spectral components 182 which are finally output as OFDM signals which are spectrum spread by a factor of 16.

On the other hand, the receiver apparatus 10b usually skips the inverse spectrum spreading process (see FIG. 8), but only when communication can not be established, it performs the inverse spectrum spreading process in advance of demodulation. As illustrated in FIG. 9, when the inverse spectrum spreading process is performed, the inverse spectrum spreading circuit 142 of the receiver apparatus 10b serves to switch the inverse spreading pattern among from a plurality of predetermined patterns to search the inverse spreading pattern, that is identical to the spreading pattern having been used in the transmitter apparatus 10a, for inverse spreading the received signals (see the spectral components 186). The inverse spectrum spreading circuit 142 then performs the inverse spectrum spreading process of the received signals by the use of the inverse spreading pattern identical to the spreading pattern having been used in the transmitter apparatus 10a. Accordingly, the inverse spectrum spreading circuit 142 outputs the signals with spectral components 188.

Also, in accordance with the second embodiment of the present invention, the receiver sensitivity can be improved by the spectrum spreading gain since the OFDM signals are spectrum spread at the transmitter apparatus and spectrum de-spread at the receiver apparatus. Because of this, it is possible to expand the variable range of the coverage of a cell in the dynamic cell structure system.

Furthermore, it is possible to implement the transmitter/reception apparatus only by partly modifying an existing system and therefore to reduce the initial cost as required when the new system is introduced in the same manner as the first embodiment of the present invention, For deciding whether to use the first embodiment or the second embodiment of the present invention, the environment of the application, the specification of the system, the implementation and so forth should be taken into consideration.

(Third Embodiment)

Next, a third embodiment of the present invention will be explained. The next generations of the wireless communication system are expected to support high speed signal transmission rates in the order of several Mbps to several tens of Mbps with a wider bandwidth exclusively occupied by each channel. Because of the limitation on the frequency resources as available, it is particularly important how to determine an effective arrangement of the respective cells in the cellular system.

Figure 10:
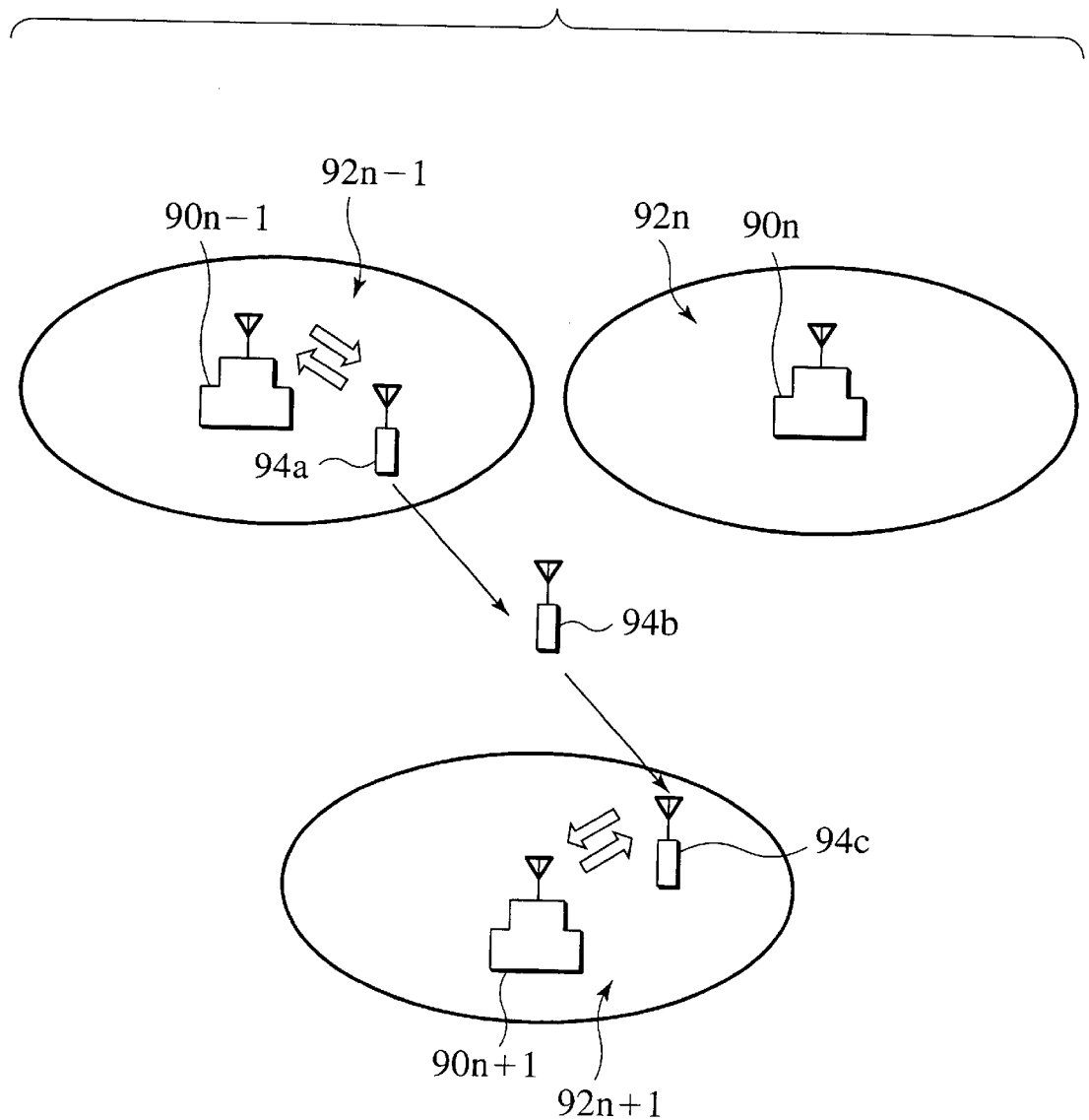
FIG. 10 is a schematic diagram showing an example of the conventional cell arrangement in the case where only one frequency is available.

FIG. 10 is a schematic diagram showing an example of the conventional cell arrangement in the case where only one frequency is available. As illustrated in FIG. 10, it is impossible to provide overlap between adjacent ones of the cells 92$n$−1, 92$n$ and 92$n$+1 of base stations 90$n$−1, 90$n$ and 90$n$+1. Accordingly, when the mobile station 94$a$ in the cell 92$n$−1 is transiting to the position 94$c$ through the position 94$b$, the communication between the mobile station 94$a$ and either the base station 90$n$−1 or the base station 90$n$+1 is disconnected. This is a serious problem of the mobile communication system and therefore it is required to implement a handover system which is reliable even if a small number of frequencies are available.

Figure 11:
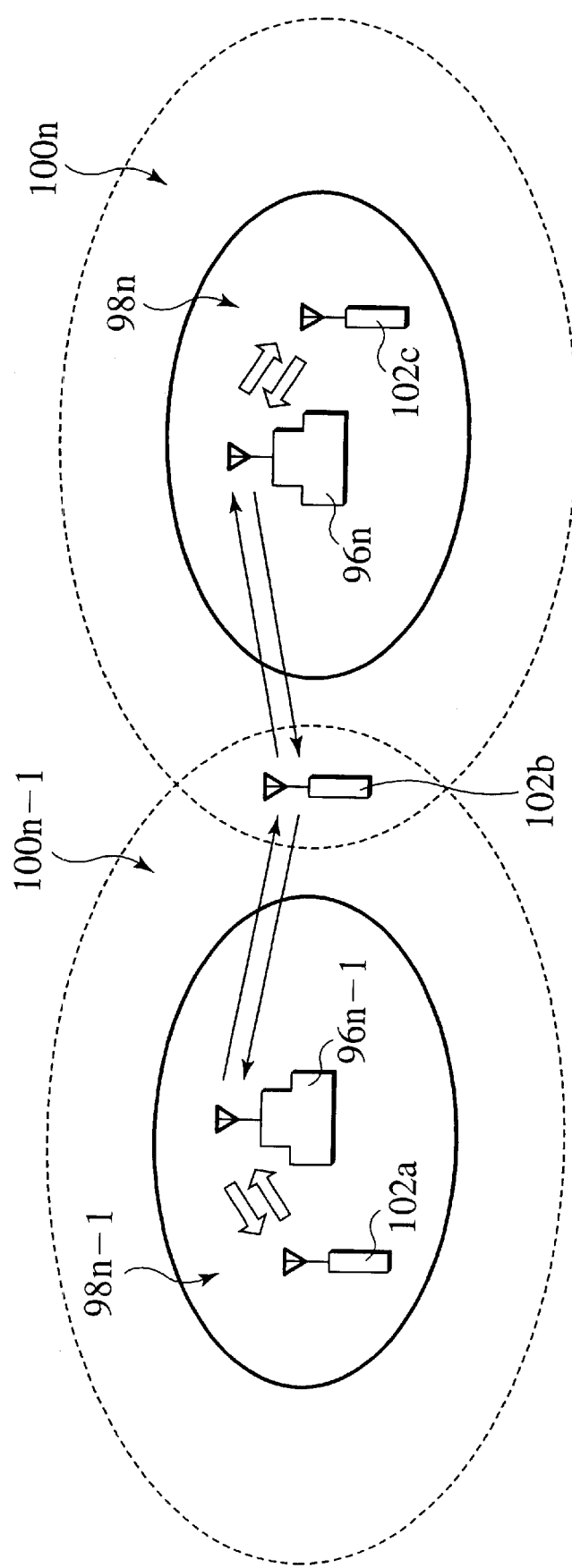
FIG. 11 is a schematic diagram showing the cell arrangement in accordance with the third embodiment of the present invention.

FIG. 11 is a schematic diagram showing the cell arrangement in accordance with the third embodiment of the present invention. The third embodiment of the present invention is provided to show examples of a base station and a mobile station, having the receiver/transmitter apparatuses in accordance with the first embodiment of the present invention, for use in the environment of the cell arrangement in the case where only one frequency is available. Namely, in accordance with the third embodiment of the present invention, adjacent cells can be located overlapped with each other by expanding the coverage of the cell of the respective base station designed in accordance with the first embodiment as described above. Meanwhile, only two base stations are illustrated for the sake of explanation.

As illustrated in FIG. 11, in the cell arrangement in accordance with the third embodiment, the respective base stations 96$n$−1 and 96$n$ serve to provide ordinary coverage 98$n$−1 and 98$n$ and spreading coverage 100$n$−1 and 100$n$. The base stations 96$n$−1 and 96$n$ perform conventional OFDM in the ordinary coverages 98$n$−1 and 98$n$ in which the mobile stations 102$a$ and 102$c$ maintain communication with the base stations 96$n$−1 and 96$n$ on the basis of the conventional OFDM.

In this case, the mobile station 102$a$ located in the ordinary coverage 98$n$−1 and the mobile station 102$c$ located in the ordinary coverage 98$n$ can be in communication with the base stations 96$n$−1 and 96$n$ to perform a higher speed data exchange than the mobile station 102$b$ located in the spreading coverage 100$n$−1 and the spreading coverage 100$n$. The mobile station 102$b$ is located in both the spreading coverage 100$n$−1 of the base station 96$n$−1 and the spreading coverage 100$n$ of the base station 96$n$. In other words, the mobile station 102$b$ can effectively receive signals from both the base station 96$n$−1 and the base station 96$n$. The base station 96$n$−1 and the base station 96$n$ share an identical frequency but make use of different patterns for spectrum spreading and inverse spectrum spreading in order to make it possible to discriminate the signals transmitted by the base station 96$n$−1 from the signals transmitted by the base station 96$n$.

In accordance with the third embodiment of the present invention, it is possible to avoid the interference associated when expanding the coverage of the cell even if adjacent cells share an identical frequency. Also, in accordance with the third embodiment of the present invention, it is possible to implement a handover system which is reliable even if a small number of frequencies are available.

Figure 12:
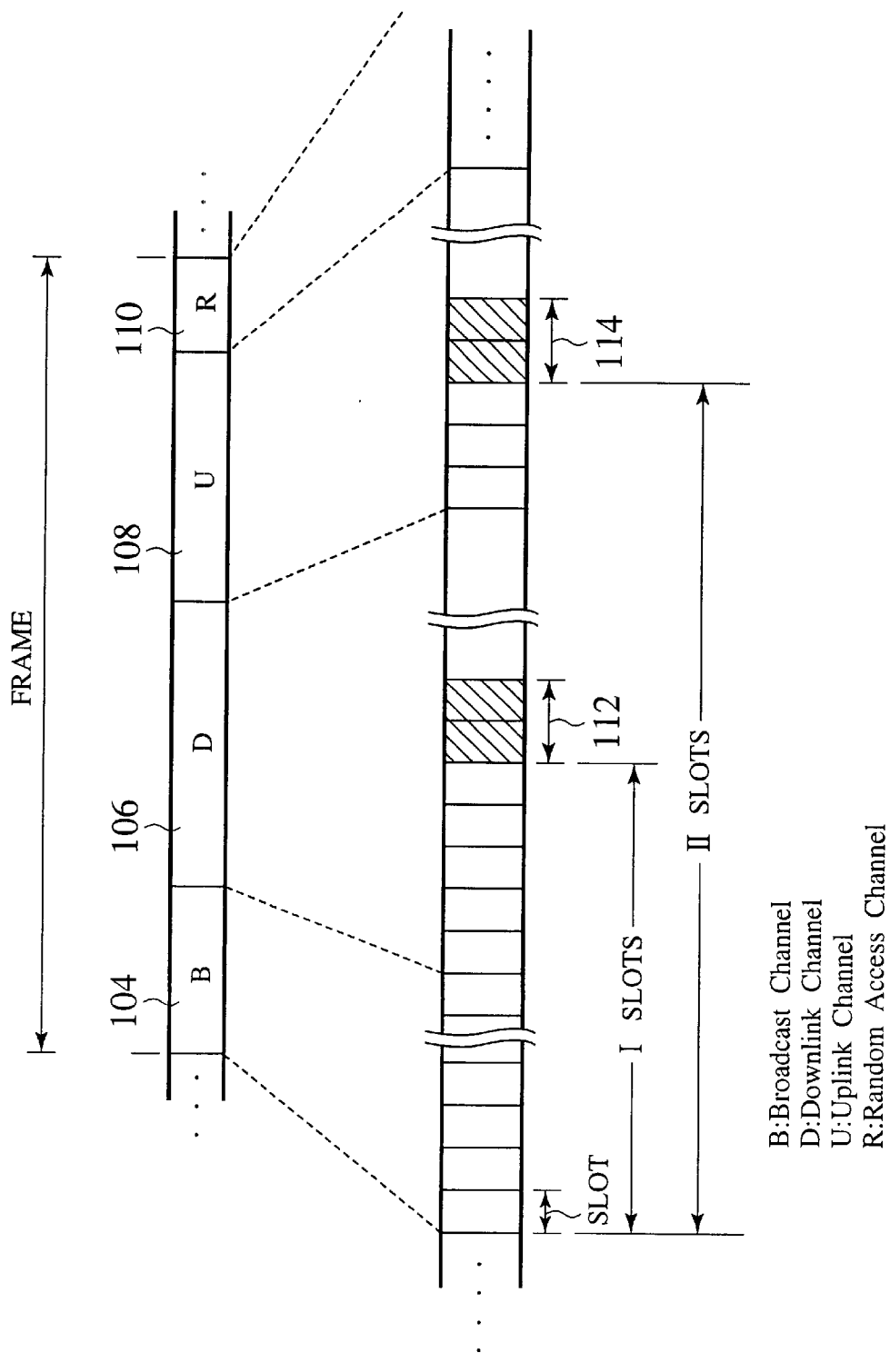
FIG. 12 is a schematic diagram showing an exemplary configuration of the burst frame in accordance with the third embodiment of the present invention.

Next, the configuration of cells and burst frames in accordance with the third embodiment of the present invention will be explained in conjunction with FIG. 11 and FIG. 12. FIG. 12 is a schematic diagram showing an exemplary configuration of the burst frame in accordance with the third embodiment of the present invention. The burst frame in accordance with the third embodiment is substantially same as illustrated in FIG. 3 showing a burst frame for the TDMA system in which time slots are allocated to the respective channels by timely division for multiplexing.

As illustrated in FIG. 12, the burst frame in accordance with the third embodiment consists of a broadcast channel 104 through which common information is broadcasted from a base station to all the mobile stations linked to the base station, a downlink channel 106 through which information items exclusive to the respective mobile stations are transfered from the base station to the individual mobile stations, an uplink channel 108 through which information items are transfered from the respective mobile stations to the base station, and a random access channel 110 through which a mobile station can transfer a request for allocation of wireless resources to the base station. The respective channels 104, 106, 108 and 110 are composed of a plurality of slots respectively.

Furthermore, in accordance with the third embodiment of the present invention, the coverage of the cell of the base station can be expanded by transmitting spectrum spread OFDM signals through the downlink channel 106 and the uplink channel 108 in order not to affect the concurrent conventional OFDM transmission. Namely, as illustrated in FIG. 12, the slots 112 in the downlink channel 106 and the slots 114 in the uplink channel 108 are allocated to the transmission of the spectrum spread OFDM signals.

For example, as illustrated in FIG. 11, the slots 112 and 114 as seen from the mobile stations 102$a$ and 102$c$ located in the ordinary coverage 98$n$−1 and 98$n$ are simply neglected in the same manner as other slots allocated to other mobile stations. For this reason, the concurrent conventional OFDM transmission is not affected by the spectrum spread OFDM signals.

On the other hand, the mobile station 102$b$ located in the spreading coverage 100$n$−1 and 100$n$ inverse spectrum spreads the signals as transmitted through the slots 112 and 114 by the use of the pattern identical to the pattern having used for spectrum spreading the same signals in the base stations 96$n$−1 and 96$n$. Because of this, the mobile station 102$b$ can reproduce the signals as transmitted through the slots 112 and 114.

Furthermore, for the purpose of providing the same services as provided for the mobile stations 102$a$ and 102$c$ located in the ordinary coverage 98$n$−1 and 98$n$, the base station has to provide for the mobile station 102$b$ located in the spreading coverage 100$n$−1 and 100$n$ with a broadcast channel, a downlink channel through which information items exclusive to the mobile stations are transfered from the base station, an uplink channel 108 through which information items are transfered from the mobile stations to the base station, and a random access channel 110 through which the mobile station can transfer a request for allocation of wireless resources to the base station. Needless to say, these signals shall not affect the concurrent conventional OFDM transmission. Accordingly, the broadcast channel, the downlink channel, the uplink channel and the random access channel for the mobile station 102b are provided within the slots 112 in the downlink channel 106 and the slots 114 in the uplink channel 108.

However, while the spectrum spread OFDM signals are transmitted through the downlink channel 106 and the uplink channel 108 which are user channels, it is generally not predetermined which slots are allocated to the spectrum spread OFDM signals. In other words, the number of the slots in the burst frame as illustrated in FIG. 12 which are preceding the slots allocated to the spectrum spread OFDM signals is depending upon the case.

To meet with this situation, in accordance with the third embodiment of the present invention, the base station serves to transmit to the mobile stations located in the ordinary coverage 98n−1 and 98n, through the broadcast channel, information about the number I of the slots in the burst frame which are preceding the slots that are located in the downlink channel and allocated to the spectrum spread OFDM signals and the number II of the slots in the burst frame which are preceding the slots that are located in the uplink channel and allocated to the spectrum spread OFDM signals, so that even when the mobile station transits to the spreading coverage, the burst frame synchronization is easily established.

More specifically explained, in the case of the third embodiment of the present invention, a mobile station located in an ordinary coverage is provided with allocation of slots other than the slots 112 and 114. When the mobile station transits from the ordinary coverage to a spreading coverage, the mobile station can no longer reproduce information from the conventional OFDM signals. In this case, the inverse spectrum spreading circuit 142 of the receiver apparatus 10b serves to switch the inverse spreading pattern among from a plurality of predetermined patterns to search the inverse spreading pattern, that is identical to the spreading pattern having been used in the transmitter apparatus 10a, for inverse spreading the received signals and to detect the positions of the slots 112 and 114. The inverse spectrum spreading circuit 142 then retrieves necessary data items from the slots 112 and 114.

The data items as retrieved are combined to form a burst frame for the TDMA system as illustrated in FIG. 3 in which time slots are allocated to the respective channels by timely division for multiplexing. Namely, also for the mobile stations located in the spreading coverage, the burst frame formed by the slots 112 and 114 in combination is composed of a broadcast channel 104 through which common information is broadcasted from a base station to all the mobile stations linked to the base station, a downlink channel 106 through which information items exclusive to the respective mobile stations are transfered from the base station to the individual mobile stations, an uplink channel 108 through which information items are transfered from the respective mobile stations to the base station, and a random access channel 110 through which a mobile station can transfer a request for allocation of wireless resources to the base station. The respective channel 104, 106, 108 and 110 are composed of a plurality of slots. Namely, individual channels independent from the ordinary coverage are implemented in the spreading coverage in which the wireless resources of the spreading coverage are allocated.

Through the broadcast channel of the spreading coverage, the base station serves to transmit to the mobile stations located in the spreading coverage 100n−1 and 100n information about the number I of the slots in the burst frame which are preceding the slots that are located in the downlink channel and allocated to the spectrum spread OFDM signals and the number II of the slots in the burst frame which are preceding the slots that are located in the uplink channel and allocated to the spectrum spread OFDM signals, so that the burst frame synchronization is easily established. Accordingly, once communication is established in spectrum spreading, it is not necessary to repeat the process for searching the inverse spreading pattern, that is identical to the spreading pattern having been used in the transmitter apparatus 10a, for inverse spreading the received signals and detecting the positions of the slots 112 and 114 even when changing the number I of the slots in the burst frame which are preceding the slots that are located in the downlink channel and allocated to the spectrum spread OFDM signals and the number II of the slots in the burst frame which are preceding the slots that are located in the uplink channel and allocated to the spectrum spread OFDM signals The configuration as described above is effective particularly when it is preferred to minimize the modification of the existing system. However, it is possible to fix the position of the slots 112 at the top of the downlink channel 106 and the position of the slots 114 at the top of the uplink channel 108 for the spectrum spread OFDM signals in order to simplify the control. In this case, there is no longer necessary the process for detecting the positions of the slots 112 and 114 and the process for reporting the numbers I and II of the slots.

In accordance with the third embodiment of the present invention, the coverage of the cell of the base station can be expanded by transmitting spectrum spread OFDM signals in order not to affect the concurrent conventional OFDM transmission.

Also, in accordance with the third embodiment of the present, it is possible to avoid the interference between adjacent cells share an identical frequency by making use of different spectrum spreading signals for different base stations. This is particularly effective when the frequency resources as available are limited.

(Fourth Embodiment)

Next, the fourth embodiment of the present invention will be explained. The fourth embodiment is provided to show examples of the transmitter apparatus and the receiver apparatus in accordance with the first or third embodiment of the present invention, in which adaptive array antennas are used. The intelligent antenna technique is effective to improve the utilization of channels as taught in the above described references, i.e., "Intelligent Antenna Technology", Communications Society Conference Vol. 1, TB-5-1, 1999, "Studies of Zone Generation Algorithm in Adaptive Variable Zone Structure System", Institute of Electronics, Information and Communication Engineers, B-5-204, 1998 and "Studies of Adaptive Variable Zone Structure System Implemented with a Directional Antenna in a Base Station", Communications Society Conference, B-5-81, 1998.

Figure 13:
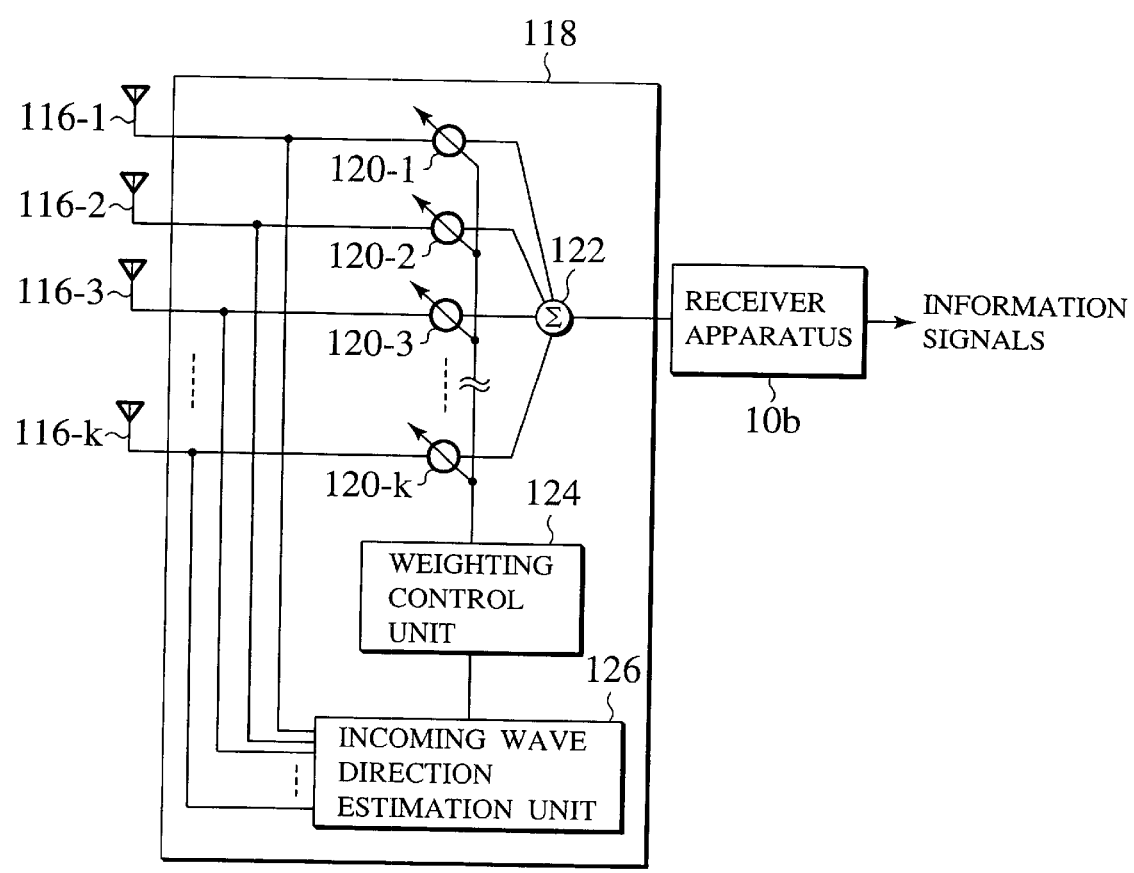
FIG. 13 is a block diagram showing the configuration of the antenna system for signal reception in accordance with the fourth embodiment of the present invention.

FIG. 13 is a block diagram showing the configuration of the antenna system for signal reception in accordance with the fourth embodiment of the present invention. As illustrated in FIG. 13, the antenna system for signal reception in accordance with the fourth embodiment is composed of a plurality of antenna elements 116-1, 116-2, 116-3, . . . and 116-k, and an antenna control unit 118 for taking control of the antenna elements 116. The antenna control unit 118 is connected to the receiver apparatus 10b. The antenna control unit 118 is composed of a plurality of the weighting units 120-1, 120-2, 120-3, . . . and 120-k, an integrating unit 122 for integrating the received signals of the antenna elements 116 respectively as weighted by means of the plurality of the weighting units 120, a weighting control unit 124 for taking control of the plurality of the weighting units 120 and an incoming wave direction estimation unit 126 for estimating the direction of incoming waves on the basis of the received signals of the antenna elements 116.

In the antenna system for signal reception in accordance with the fourth embodiment, the incoming wave direction estimation unit 126 receives the signals as received by the antenna elements 116 respectively, and estimates the direction of the incoming waves to be received on the basis of the reception levels of the respective signals. The estimation is performed in accordance with an incoming wave direction estimation algorithm, e.g., MUSIC, ESPRIT and so forth. The weighting control unit 124 then controls the weights assigned to the respective weighting units 120 on the basis of the result of the estimation. The details of MUSIC is described in "Multiple Emitter Location and Signal Parameter Estimation", IEEE, Trans., Vol. AP-32, No.3, pp.276–280, March 1986. Also, the details of ESPRIT is described in "ESPRIT-Estimation of Signal Parameters via Rotational Invariance Techniques", IEEE, Trans., Vol. AP-37, pp.984–995, July 1986.

FIG. 14 is a block diagram showing the configuration of the antenna system for signal transmission in accordance with the fourth embodiment of the present invention. As illustrated in FIG. 14 the antenna system for signal transmission in accordance with the fourth embodiment is composed of a plurality of antenna elements 128-1, 128-2, 128-3, . . . and 128-1, and an antenna control unit 130 for taking control of the antenna elements 128. The antenna control unit 118 is connected to the transmitter apparatus 10a and the receiver apparatus 10b respectively. The antenna control unit 130 is composed of a plurality of weighting units 134-1, 134-2, 134-3, . . . and 134-k provided corresponding to the antenna elements 128 respectively, a splitter 136 for splitting the transmission signal as outputted from the transmitter apparatus 10a, a weighting control unit 138 for taking control of the plurality of the weighting units 134 and a plurality of circulators 132-1, 132-2, 132-3, . . . and 132-1 provided corresponding to the antenna elements 128 respectively for outputting the transmission signal as weighted by the corresponding weighting units 134 and outputting the received signals as input from the antenna elements 128.

In the antenna system for signal transmission in accordance with the fourth embodiment of the present invention, the splitter 136 serves to split the transmission signals as generated by the transmitter apparatus 10a, and output the transmission signals as split to the respective weighting units 134. The weighting control unit 138 serves to control the weight factors assigned to the respective weighting units 134 on the basis of the control signals from the receiver apparatus 10b. The receiver apparatus 10b serves to generate the control signals on the basis of the incoming wave direction estimation unit 126 as illustrated in FIG. 13. The receiver apparatus 10b controls the weighting control unit 138 in order to direct the beam in the same direction as the incoming waves to be received.

The base station in accordance with the fourth embodiment of the present invention serves to transmit the spectrum spread OFDM signals to a mobile station remote from the base station. The signal transmission rate of the spectrum spread OFDM signals is lower than that of the conventional OFDM signal. In other words, the coverage of a cell is expanded by lowering the signal transmission rate. Thus, there is a significant advantage with respect to the method of controlling the direction of a beam to a remote mobile station in a position where communication link can be maintained by the antenna gain generated by directing the beam to the mobile station. Namely, in accordance with the fourth embodiment of the present invention, it is possible to obtain necessary information for controlling the direction of a beam to a remote mobile station in a position where communication link can be maintained by the antenna gain generated by directing the beam to the mobile station.

Furthermore, it is possible to establish communication by means of the conventional OFDM signals once the necessary information indicative of the initial position of the remote mobile station is obtained when the remote mobile station is located in the position where communication link can be maintained by the antenna gain generated by directing the beam to the mobile station. In this case, the weight factors of the adaptive array antenna are calculated on the basis of the conventional OFDM signals rather than the spectrum spread OFDM signals. Namely, in accordance with the fourth embodiment of the present invention, once the communication link is established, it is possible to make use of a conventional technique for controlling the weight factors of an adaptive array antenna.

More specifically explained with reference to FIG. 12, in the case of the fourth embodiment of the present invention, a mobile station located in an ordinary coverage is provided with allocation of slots other than the slots 112 and 114. When the mobile station transits from the ordinary coverage to a spreading coverage, the mobile station can no longer reproduce information from the conventional OFDM signals. The inverse spectrum spreading circuit 142 then initiates searching of the inverse spreading pattern, that is identical to the spreading pattern having been used in the transmitter apparatus 10a by switching the inverse spreading pattern among from a plurality of predetermined patterns for all the slots of the downlink channel 106 and the uplink channel 108 in order to detect the positions of the slots 112 and 114. The inverse spectrum spreading circuit 142 then retrieves necessary data items from the slots 112 and 114. However, in this case, the spectrum spread OFDM signals is not used for the purpose of exchanging user data unlike the third embodiment of the present invention. The spectrum spread OFDM signals is used only for the purpose of detecting the location of the mobile station having transited from the ordinary coverage to the spreading coverage. After completing the detection of the location of the mobile station having transited from the ordinary coverage to the spreading coverage, a beam of the adaptive array antenna is directed to the mobile station. By this process, the received signal level as required for establishing the conventional OFDM communication can be obtained. The mobile station is then capable of transfering a request for allocation of wireless resources to the base station through the random access channel 110 by means of the conventional OFDM signals. The mobile station having transited from the ordinary coverage to the spreading coverage can therefore resume the communication with the base station even in the spreading coverage in the same manner as in the ordinary coverage. After resuming the communication by means of the conventional OFDM, the communication channel through the spectrum spread OFDM signals is released.

In accordance with the fourth embodiment of the present invention, it is possible to solve the conventional problem of how to determine the initial position of a remote mobile station (the initial position determination) and to improve the utilization of the frequency resources by effectively controlling the weight factors given to an adaptive array antenna in the dynamic zone structure.

Accordingly, in accordance with the present invention, it is possible to realize a transmitter apparatus and a receiver apparatus in which the variable range of the coverage of a cell in the dynamic cell structure system can be expanded.

Also, in accordance with the present invention, it is possible to realize a transmitter apparatus, a receiver apparatus and a base station provided with these apparatuses, in which the interference between adjacent cells is effectively prevented even in the cell arrangement where the frequency resources as available are limited.

Furthermore, in accordance with the present invention, it is possible to realize a transmitter apparatus, a receiver apparatus and abase station provided with these apparatuses, in which it is possible to obtain information necessary for taking appropriate control of the antenna in order to direct a beam to the mobile station that is located in a remote position where a communication link can be established only by securing a necessary antenna gain through the adaptive array antenna directed to that mobile station.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A transmitter apparatus making use of an orthogonal frequency division multiplexing modulation and a spectrum spreading modulation in combination comprising:

an orthogonal frequency division multiplexing circuit which selectively modulates information signals to be transmitted by orthogonal frequency division multiplexing;

a spectrum spreading circuit which selectively performs a spectrum spreading modulation of said information signals to be transmitted; and a transmission signal processing circuit which transfers said information signals which have been modulated by either said orthogonal frequency division multiplexing modulation or said spectrum spreading modulation to a receiver apparatus as a transmission signal, wherein, when said receiver apparatus and said transmitter apparatus are located so close to each other that the received signal level of said receiver apparatus is sufficient to maintain the communication between said receiver apparatus and said transmitter apparatus with signals which are modulated on the basis of said orthogonal frequency division multiplexing modulation but not modulated on the basis of said spectrum spreading modulation, said orthogonal frequency division multiplexing circuit performs the modulation of said information signals to be transmitted while said spectrum spreading circuit does not perform said spectrum spreading modulation of said information signals to be transmitted, and wherein, when said receiver apparatus and said transmitter apparatus are located so remote from each other that the received signal level of said receiver apparatus is not sufficient to maintain the communication between said receiver apparatus and said transmitter apparatus with signals which are modulated on the basis of said orthogonal frequency division multiplexing modulation but not modulated on the basis of said spectrum spreading modulation, said orthogonal frequency division multiplexing circuit does not perform said orthogonal frequency division multiplexing modulation of said information signals to be transmitted while said spectrum spreading circuit performs said spectrum spreading modulation of said information signals to be transmitted.

2. The transmitter apparatus as claimed in claim 1 wherein said orthogonal frequency division multiplexing circuit is provided with a serial-to-parallel converter which converts said information signals to be transmitted from a serial data sequence to a parallel data sequence, a modulator which serves to map said parallel data as converted by said serial-to-parallel converter onto symbols in the frequency domain, an inverse fast Fourier transform unit which performs the inverse fast Fourier transformation of said information signals as mapped and a parallel-to-serial converter which converts the output data sequence of the IFFT unit 16 from a parallel data sequence to a serial data sequence.

3. The transmitter apparatus as claimed in claim 1 wherein said spectrum spreading circuit is provided with a spectrum spreading pattern generation circuit which generates a plurality of spectrum spreading patterns for use in said spectrum spreading modulation.

4. The transmitter apparatus as claimed in claim 1 wherein said transmission signal processing circuit is provided with an adaptive array antenna and wherein, when said receiver apparatus and said transmitter apparatus are located so remote from each other that the received signal level of said receiver apparatus is not sufficient to maintain the communication between said receiver apparatus and said transmitter apparatus with signals which are modulated on the basis of said orthogonal frequency division multiplexing modulation but not modulated on the basis of said spectrum spreading modulation, the direction of said receiver apparatus relative to said transmitter apparatus is detected by making use of a transmission signal which is modulated by said spectrum spreading modulation, followed by directing a beam of the adaptive array antenna to said mobile station to increase the received signal level of said receiver apparatus and make it possible to perform the communication between said receiver apparatus and said transmitter apparatus by orthogonal frequency division multiplexing.

5. A transmitter apparatus making use of orthogonal frequency division multiplexing modulations and a spectrum spreading modulation in combination comprising:

an orthogonal frequency division multiplexing circuit which performs a first orthogonal frequency division multiplexing modulation of information signals to be transmitted;

a spectrum spreading circuit which selectively performs a spectrum spreading modulation of the output of said orthogonal frequency division multiplexing circuit; and a transmission signal processing circuit which transfers the output of said spectrum spreading circuit to a receiver apparatus as a transmission signal, wherein, when said receiver apparatus and said transmitter apparatus are located so close to each other that the received signal level of said receiver apparatus is sufficient to maintain the communication between said receiver apparatus and said transmitter apparatus with signals which are modulated by said first orthogonal frequency division multiplexing modulation but not modulated on the basis of said spectrum spreading modulation, said orthogonal frequency division multiplexing circuit performs said first orthogonal frequency division multiplexing modulation while said spectrum spreading circuit does not perform said spectrum spreading modulation of the output of said orthogonal frequency division multiplexing circuit, and wherein, when said receiver apparatus and said transmitter apparatus are located so remote from each other that the received signal level of said receiver apparatus is not sufficient to maintain the communication between said receiver apparatus and said transmitter apparatus with signals which are modulated by said first orthogonal frequency division multiplexing modulation but not modulated on the basis of said spectrum spreading modulation, said orthogonal frequency division multiplexing circuit performs a second orthogonal frequency division multiplexing modulation having a bandwidth which is narrower than that of said first orthogonal frequency division multiplexing modulation while said spectrum spreading circuit performs said spectrum spreading modulation of the output of said orthogonal frequency division multiplexing circuit.

6. The transmitter apparatus as claimed in claim 5 wherein said orthogonal frequency division multiplexing circuit serves to perform a phase shift keying modulation of said information signals.

7. A transmitter apparatus making use of orthogonal frequency division multiplexing modulations and a spectrum spreading modulation in combination comprising:

a mapping circuit which serves to map information signals to be transmitted onto symbols in the frequency domain suitable for a first orthogonal frequency division multiplexing modulation;

a spectrum spreading circuit which selectively performs a spectrum spreading modulation of the output of said mapping circuit;

an orthogonal frequency division multiplexing circuit which performs said first orthogonal frequency division multiplexing modulation of the output signal of said spectrum spreading circuit; and a transmission signal processing circuit which transfers the output of said orthogonal frequency division multiplexing circuit to a receiver apparatus as a transmission signal, wherein, when said receiver apparatus and said transmitter apparatus are located so close to each other that the received signal level of said receiver apparatus is sufficient to maintain the communication between said receiver apparatus and said transmitter apparatus with signals which are modulated by said first orthogonal frequency division multiplexing modulation but not modulated on the basis of said spectrum spreading modulation, said orthogonal frequency division multiplexing circuit performs said first orthogonal frequency division multiplexing modulation while said spectrum spreading circuit does not perform said spectrum spreading modulation of the output of said mapping circuit, and wherein, when said receiver apparatus and said transmitter apparatus are located so remote from each other that the received signal level of said receiver apparatus is not sufficient to maintain the communication between said receiver apparatus and said transmitter apparatus with signals which are modulated by said first orthogonal frequency division multiplexing modulation but not modulated on the basis of said spectrum spreading modulation, said orthogonal frequency division multiplexing circuit performs a second orthogonal frequency division multiplexing modulation having a bandwidth which is narrower than that of said first orthogonal frequency division multiplexing modulation while said spectrum spreading circuit performs said spectrum spreading modulation of the output of said mapping circuit.

8. The transmitter apparatus as claimed in claim 7 wherein said transmission signal processing circuit is provided with an adaptive array antenna and wherein, when said receiver apparatus and said transmitter apparatus are located so remote from each other that the received signal level of said receiver apparatus is not sufficient to maintain the communication between said receiver apparatus and said transmitter apparatus with signals which are modulated on the basis of said orthogonal frequency division multiplexing modulation but not modulated on the basis of said spectrum spreading modulation, the direction of said receiver apparatus relative to said transmitter apparatus is detected by making use of a transmission signal which is modulated by said spectrum spreading modulation, followed by directing a beam of the adaptive array antenna to said mobile station to increase the received signal level of said receiver apparatus and make it possible to perform the communication between said receiver apparatus and said transmitter apparatus by said first orthogonal frequency division multiplexing modulations.

9. A receiver apparatus making use of an orthogonal frequency division demultiplexing demodulation and an inverse spectrum spreading demodulation in combination comprising:

an inverse spectrum spreading circuit which selectively demodulates information signals transmitted from a transmitter apparatus and received by said receiver apparatus by performing inverse spectrum spreading demodulation of said information signals;

an orthogonal frequency division demultiplexing circuit which selectively demodulates said information signals;

wherein, when said receiver apparatus and said transmitter apparatus are located so close to each other that the received signal level of said receiver apparatus is sufficient to maintain the communication between said receiver apparatus and said transmitter apparatus with signals which are demodulated on the basis of said orthogonal frequency division demultiplexing demodulation but not demodulated on the basis of said inverse spectrum spreading demodulation, said orthogonal frequency division demultiplexing circuit performs the demodulation of information signals as received while said inverse spectrum spreading circuit does not perform said inverse spectrum spreading demodulation of said information signals as received, and wherein, when said receiver apparatus and said transmitter apparatus are located so remote from each other that the received signal level of said receiver apparatus is not sufficient to maintain the communication between said receiver apparatus and said transmitter apparatus with signals which are demodulated on the basis of said orthogonal frequency division multiplexing demodulation but not demodulated on the basis of said inverse spectrum spreading demodulation, said inverse spectrum spreading circuit performs said inverse spectrum spreading demodulation of said information signals as received while said orthogonal frequency division demultiplexing circuit does not perform said orthogonal frequency division demultiplexing demodulation.

10. The receiver apparatus as claimed in claim 9 wherein said orthogonal frequency division demultiplexing circuit serves also to perform a phase shift keying demodulation of said information signals as received.

11. A receiver apparatus making use of an orthogonal frequency division demultiplexing demodulation and an inverse spectrum spreading demodulation in combination comprising:

an orthogonal frequency division demultiplexing circuit which demodulates information signals transmitted from a transmitter apparatus and received by said receiver apparatus on the basis of a first orthogonal frequency division demultiplexing demodulation;

an inverse spectrum spreading circuit which selectively demodulates the output of said orthogonal frequency division demultiplexing circuit by performing inverse spectrum spreading demodulation of said information signals as demultiplexed; and a demapping circuit which serves to demap said information signals as inverse spread from symbols in the frequency domain suitable for said first orthogonal frequency division demultiplexing demodulation;

wherein, when said receiver apparatus and said transmitter apparatus are located so close to each other that the received signal level of said receiver apparatus is sufficient to maintain the communication between said receiver apparatus and said transmitter apparatus with signals which are demodulated on the basis of said first orthogonal frequency division demultiplexing demodulation but not demodulated on the basis of said inverse spectrum spreading demodulation, said orthogonal frequency division demultiplexing circuit performs said first orthogonal frequency division demultiplexing demodulation of information signals as received while said inverse spectrum spreading circuit does not perform said inverse spectrum spreading demodulation of said information signals as received, and wherein, when said receiver apparatus and said transmitter apparatus are located so remote from each other that the received signal level of said receiver apparatus is not sufficient to maintain the communication between said receiver apparatus and said transmitter apparatus with signals which are demodulated on the basis of said orthogonal frequency division multiplexing demodulation but not demodulated on the basis of said inverse spectrum spreading demodulation, said inverse spectrum spreading circuit performs said inverse spectrum spreading demodulation of said information signals as received while said orthogonal frequency division demultiplexing circuit performs a second orthogonal frequency division demultiplexing demodulation having a bandwidth which is narrower than that of said first orthogonal frequency division demultiplexing demodulation.

12. A receiver apparatus making use of an orthogonal frequency division demultiplexing demodulation and an inverse spectrum spreading demodulation in combination comprising:

an orthogonal frequency division demultiplexing circuit which selectively demodulates information signals transmitted from a transmitter apparatus and received by said receiver apparatus by performing an orthogonal frequency division demultiplexing demodulation of said information signals;

an inverse spectrum spreading circuit which selectively demodulates the output of said orthogonal frequency division demultiplexing circuit by performing inverse spectrum spreading demodulation of the information signals as received;

a demapping circuit which serves to selectively demap said information signals as demodulated by said orthogonal frequency division demultiplexing demodulation from symbols in the frequency domain suitable for said orthogonal frequency division demultiplexing demodulation;

wherein, when said receiver apparatus and said transmitter apparatus are located so close to each other that the received signal level of said receiver apparatus is sufficient to maintain the communication between said receiver apparatus and said transmitter apparatus with signals which are demodulated on the basis of said first orthogonal frequency division demultiplexing demodulation but not demodulated on the basis of said inverse spectrum spreading demodulation, said orthogonal frequency division demultiplexing circuit performs the demodulation of information signals as received while said inverse spectrum spreading circuit does not perform said inverse spectrum spreading demodulation of said information signals as received, and wherein, when said receiver apparatus and said transmitter apparatus are located so remote from each other that the received signal level of said receiver apparatus is not sufficient to maintain the communication between said receiver apparatus and said transmitter apparatus with signals which are demodulated on the basis of said orthogonal frequency division multiplexing demodulation but not demodulated on the basis of said inverse spectrum spreading demodulation, said inverse spectrum spreading circuit performs said inverse spectrum spreading demodulation of said information signals as received while said orthogonal frequency division demultiplexing circuit does not perform said orthogonal frequency division demultiplexing demodulation.

13. The receiver apparatus as claimed in claim 12 wherein said inverse spectrum spreading circuit is provided with a spectrum spreading pattern generation circuit which generates a plurality of spectrum spreading patterns for use in said inverse spectrum spreading demodulation.

14. The receiver apparatus as claimed in claim 12 wherein said orthogonal frequency division demultiplexing circuit is provided with a serial-to-parallel converter which converts the information signals as received from a serial data sequence to a parallel data sequence and a fast Fourier transform unit which performs the fast Fourier transformation of said information signals as converted to said parallel data sequence.

15. The receiver apparatus as claimed in claim 13 wherein said inverse spectrum spreading circuit makes use of different spectrum spreading patterns for different transmitter apparatuses.

16. A base station which serves to establish communication with at least one mobile station located in a communication area where said base station is responsible for communication comprising:

a transmitter apparatus capable of transmitting information signals in a first transmission mode which has a first transmission speed and a first gain and transmitting information signals in a second transmission mode which has a second transmission speed which is lower than said first transmission speed and a second gain which is greater than said first gain;

a receiver apparatus capable of receiving a first reception mode which receives information signals having been transmitted in said first transmission mode and receiving a second reception mode which receives information signals having been transmitted in said second transmission mode;

wherein, when said mobile station and said base station are located so close to maintain communication between said mobile station and said base station in said first transmission mode and said first reception mode, said base station maintains communication between said mobile station and said base station in said first transmission mode and said first reception mode, wherein, when said mobile station and said base station are located too remote to maintain communication between said mobile station and said base station in said first transmission mode and said first reception mode, said base station establishes communication between said mobile station and said base station in said second transmission mode and said second reception mode.

17. The base station as claimed in claim 16 wherein said base station makes use of said second transmission mode and said second reception mode for communication with a mobile station which is located in an overlapping area between said communication area where said base station is responsible for communication and an adjacent area where an adjacent base station is responsible for communication.

18. The base station as claimed in claim 17 wherein said base station and an adjacent base station thereto share the same communication resources for said first transmission mode and said first reception mode respectively and make use of separate communication resources for said second transmission mode and said second reception mode respectively.

19. The base station as claimed in claim 16 wherein said base station is provided with an adaptive array antenna and wherein, when said mobile station and said base station are located so remote from each other that the received signal level of said base station is not sufficient to maintain the communication between said mobile station and said base station in said first transmission mode and said first reception mode, said base station establishes communication with said mobile station in said second transmission mode and said second reception mode, detects the direction of said mobile station relative to said base station, directing a beam of the adaptive array antenna to said mobile station in order to improve the gain in said first transmission mode and said first reception mode, and then establishing communication with said mobile station in said first transmission mode and said first reception mode.

20. A base station which serves to establish communication with at least one mobile station located in a communication area where said base station is responsible for communication comprising:

a transmitter transmitting information signals in a first transmission mode which has a first transmission speed and a first gain and transmitting information signals in a second transmission mode which has a second transmission speed which is lower than said first transmission speed and a second gain which is greater than said first gain;

wherein, when said mobile station and said base station are located so close to maintain communication between said mobile station and said base station in said first transmission mode, said base station maintains communication between said mobile station and said base station in said first transmission mode, wherein, when said mobile station and said base station are located too remote to maintain communication between said mobile station and said base station in said first transmission mode, said base station establishes communication between said mobile station and said base station in said second transmission mode.

21. The base station as claimed in claim 20 wherein said base station makes use of said second transmission mode for communication with a mobile station which is located in an overlapping area between said communication area where said base station is responsible for communication and an adjacent area where an adjacent base station is responsible for communication.

22. The base station as claimed in claim 20 wherein said base station is provided with an adaptive array antenna and wherein, when said mobile station and said base station are located so remote from each other that the received signal level of said base station is not sufficient to maintain the communication between said mobile station and said base station in said first transmission mode, said base station establishes communication with said mobile station in said second transmission mode, detects the direction of said mobile station relative to said base station, directing a beam of the adaptive array antenna to said mobile station in order to improve the gain in said first transmission mode, and then establishing communication with said mobile station in said first transmission mode.

* * * * *